(12) United States Patent
Matsui et al.

(10) Patent No.: US 6,330,039 B2
(45) Date of Patent: Dec. 11, 2001

(54) PICTURE DISPLAY APPARATUS FOR DISPLAYING A COLORED PICTURE

(75) Inventors: Takeshi Matsui, Tokyo; Takuji Yoshida, Kanagawa; Shunichi Hashimoto, Kanagawa; Yoshinori Tanaka, Kanagawa; Osamu Akimoto, Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/828,743

(22) Filed: Apr. 9, 2001

Related U.S. Application Data

(63) Continuation of application No. 09/046,497, filed on Mar. 23, 1998.

(30) Foreign Application Priority Data

Mar. 24, 1997 (JP) .................................................. 9-069801

(51) Int. Cl.[7] .................................................. H04N 9/31
(52) U.S. Cl. .......................................... 348/742; 348/744
(58) Field of Search .................................... 348/744, 750, 348/751, 758, 759, 760, 761, 766, 756, 757, 742, 268, 269; H04N 5/74, 9/31

(56) References Cited

U.S. PATENT DOCUMENTS

| 4,090,219 | 5/1978 | Ernstoff et al. |
| 5,526,063 | 6/1996 | Joubert et al. |
| 5,530,489 | 6/1996 | Henderson et al. |
| 5,883,681 | 3/1999 | Kono et al. |
| 5,903,323 | 5/1999 | Ernstoff et al. |
| 6,034,666 | 3/2000 | Kanai et al. |

Primary Examiner—Sherrie Hsia
(74) Attorney, Agent, or Firm—Frommer Lawrence & Haug LLP; William S. Frommer; Dennis M. Smid

(57) ABSTRACT

A picture display method and apparatus in which a light source is lengthened in service life and optimum color reproduction is realized, while the light utilization efficiency is improved to reduce the power consumption and the size of the apparatus. The red, green and blue illuminating light beams radiated from the light-emitting diodes 12R, 12G and 12R, are illuminated via relay lenses and field lenses on picture display light valves 11R, 11G and 11B and spatially modulated in intensity so as to be synthesized by a synthesis prism 10 and so as to be projected to an enlarged scale on a screen 17. The profile of the light radiating portions of the light-emitting diodes 12R, 12G and 12B are set so as to be the same or similar to the profile of a picture display area of each of the picture display light valves 11R, 11G and 11B in order that the profile of the light beam illuminated on the picture display area will be in keeping with the profile of the picture display area.

4 Claims, 32 Drawing Sheets

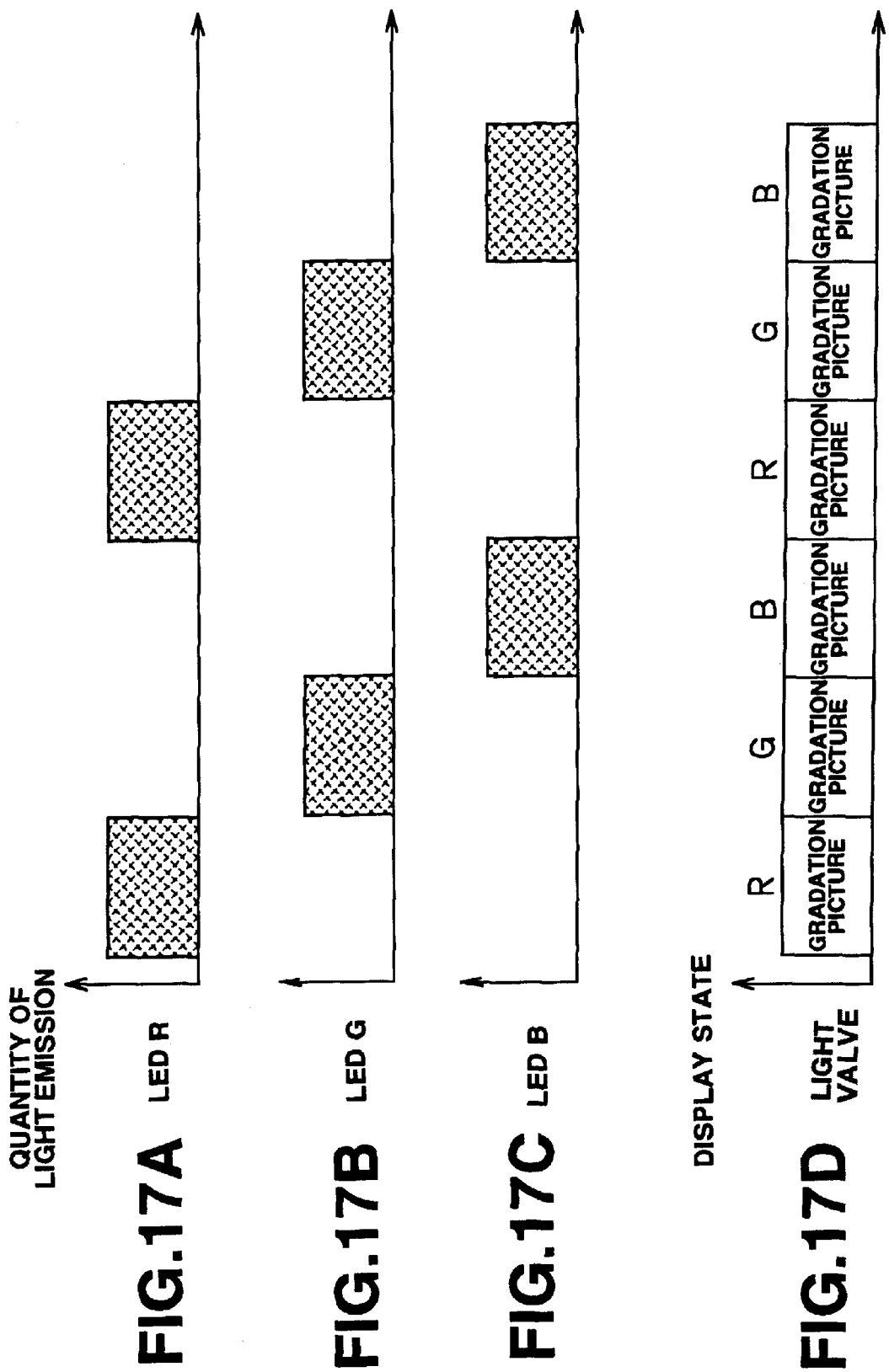

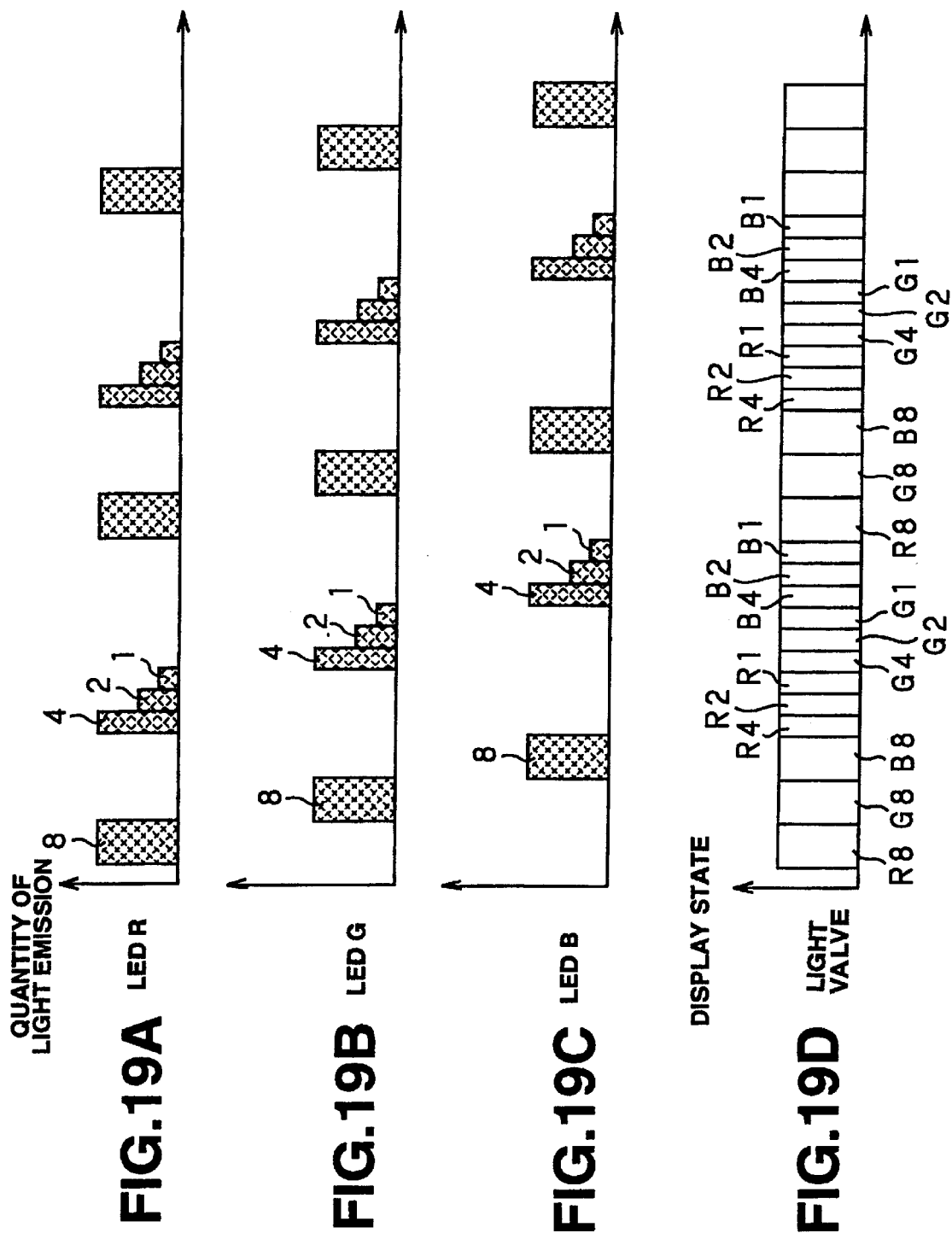

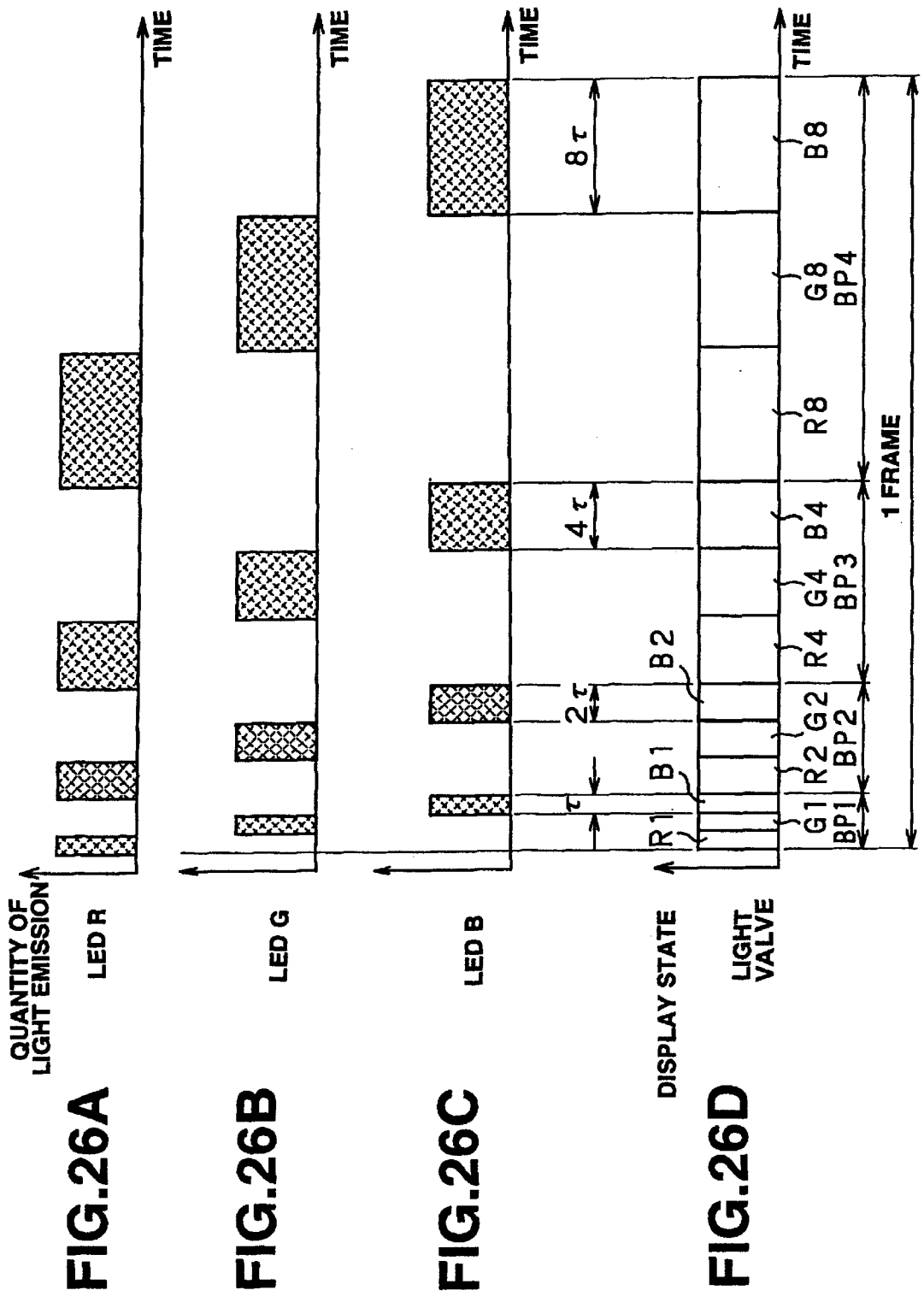

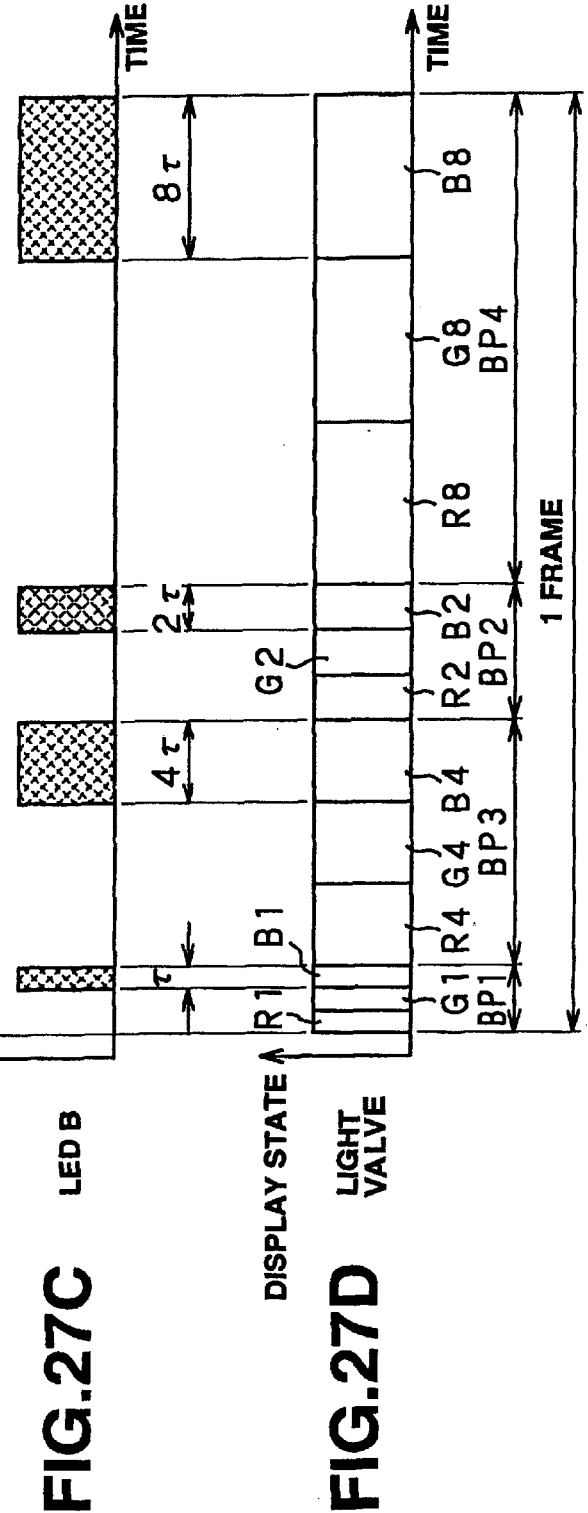
FIG.27A LED R
FIG.27B LED G
FIG.27C LED B
FIG.27D LIGHT VALVE

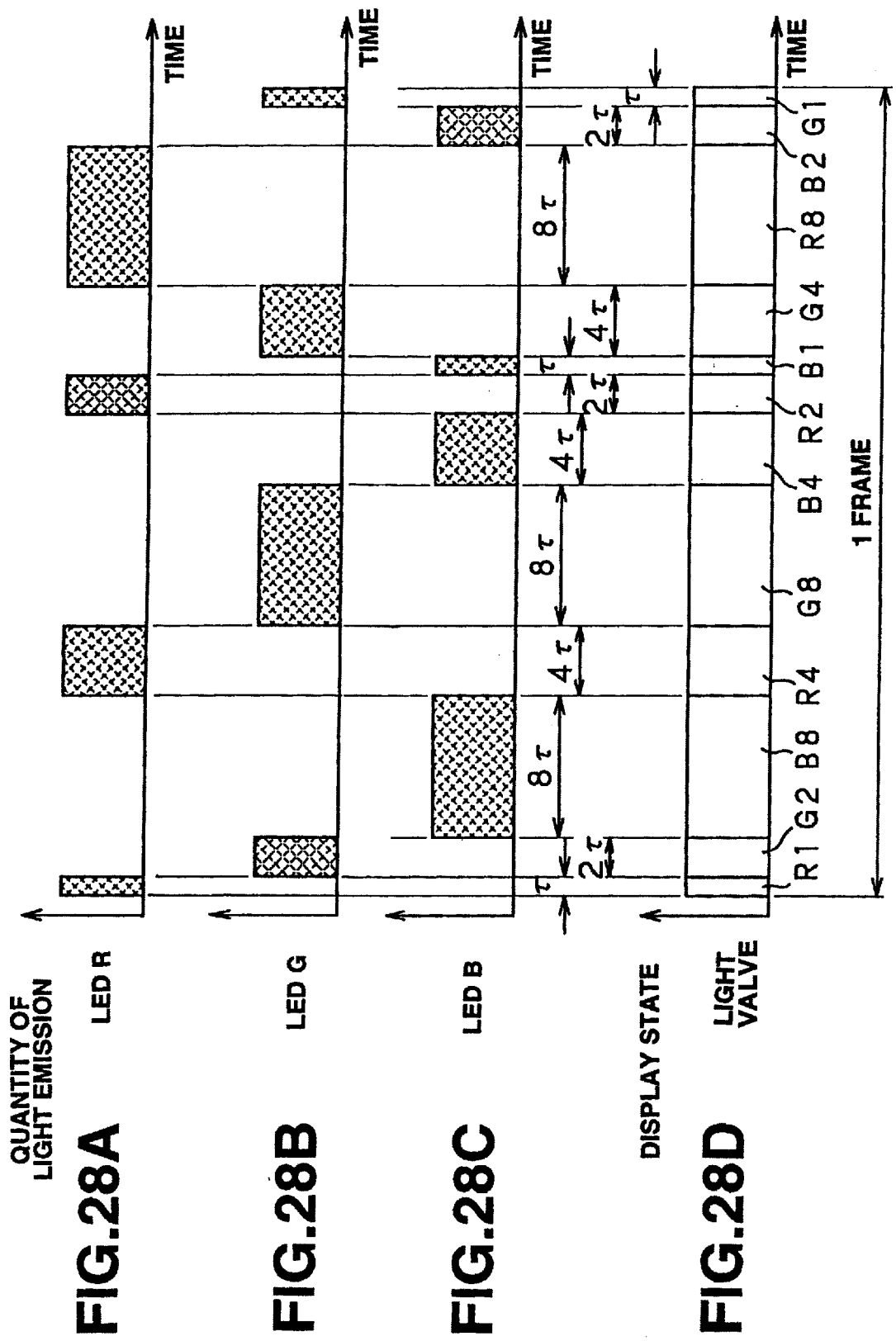

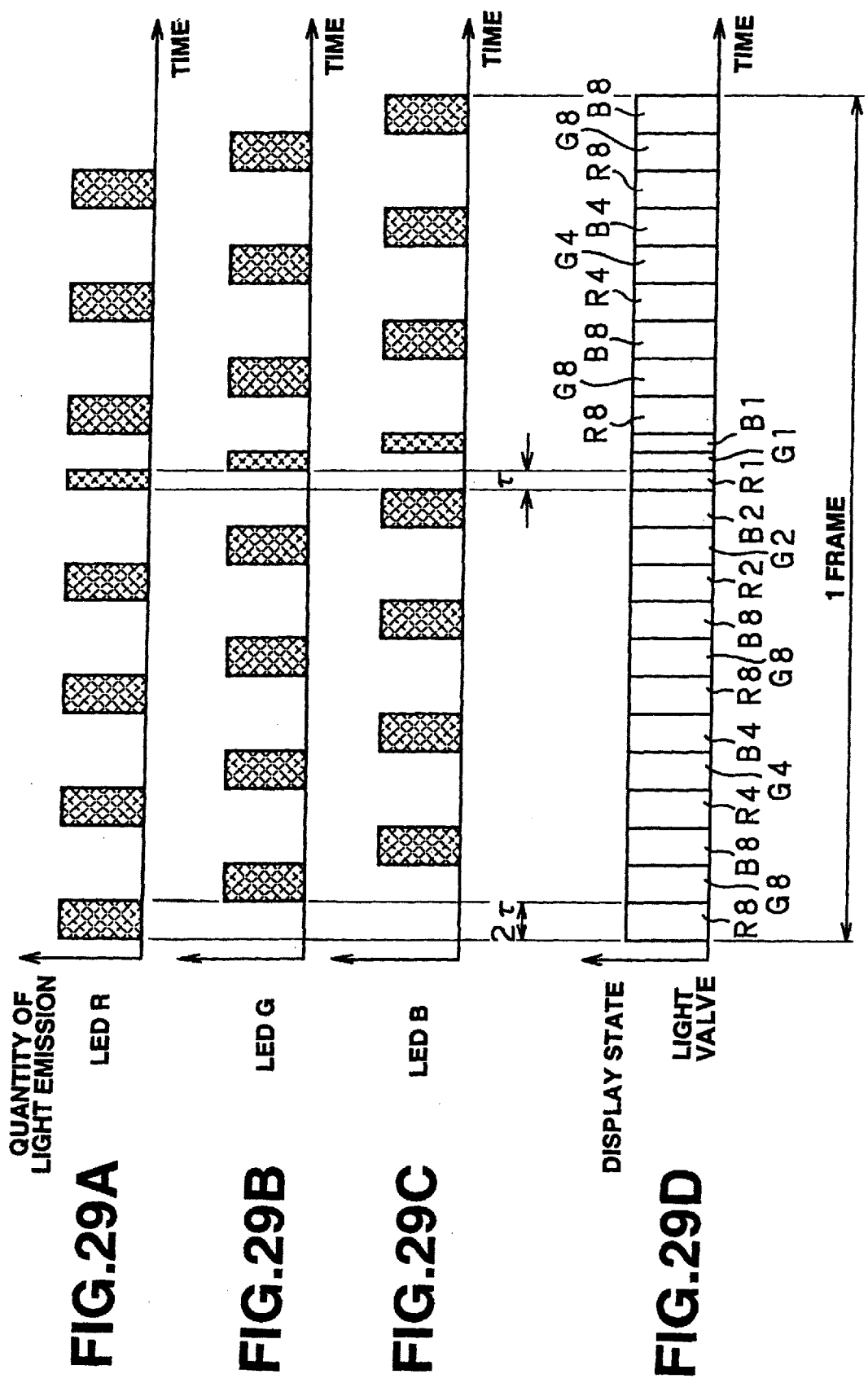

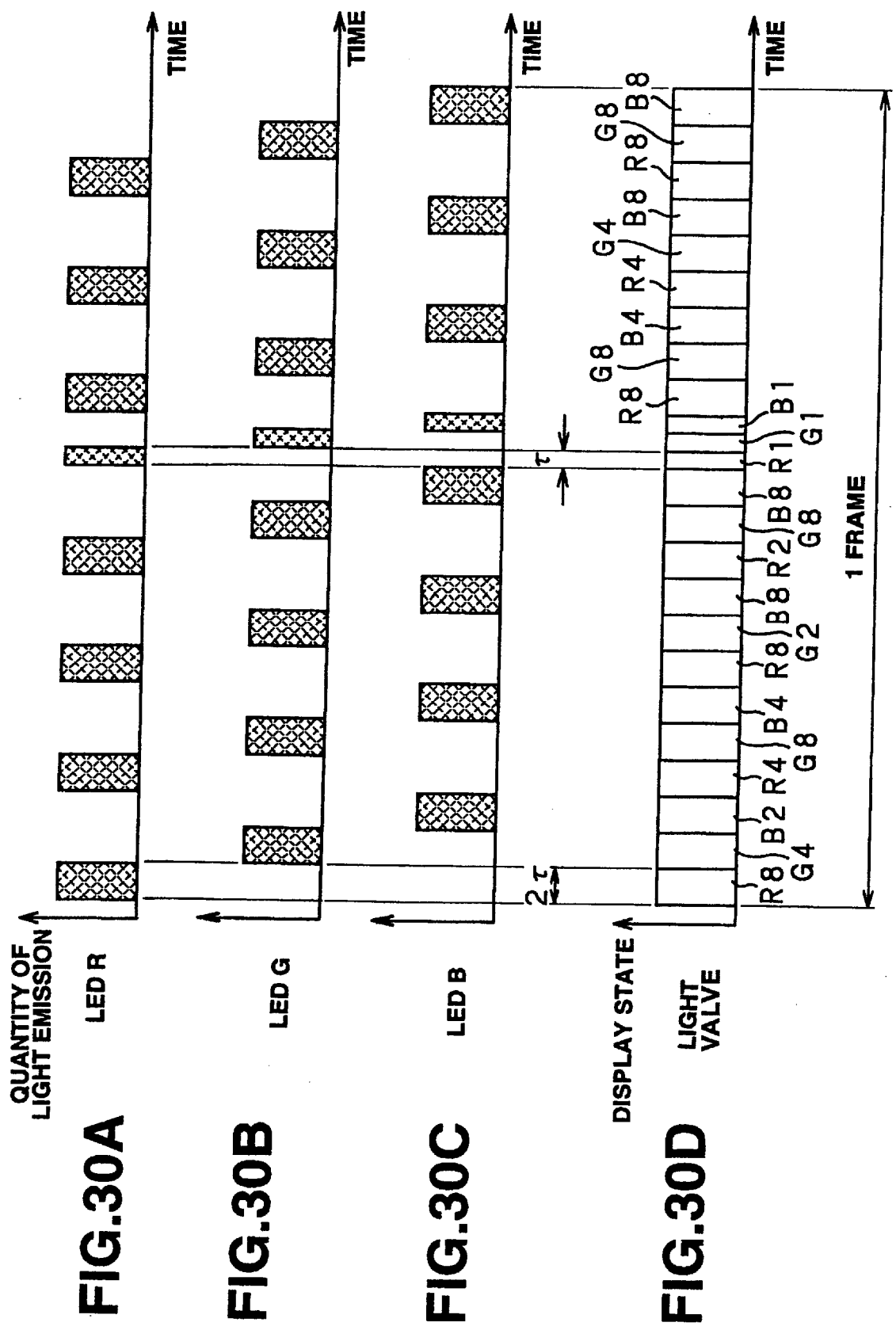

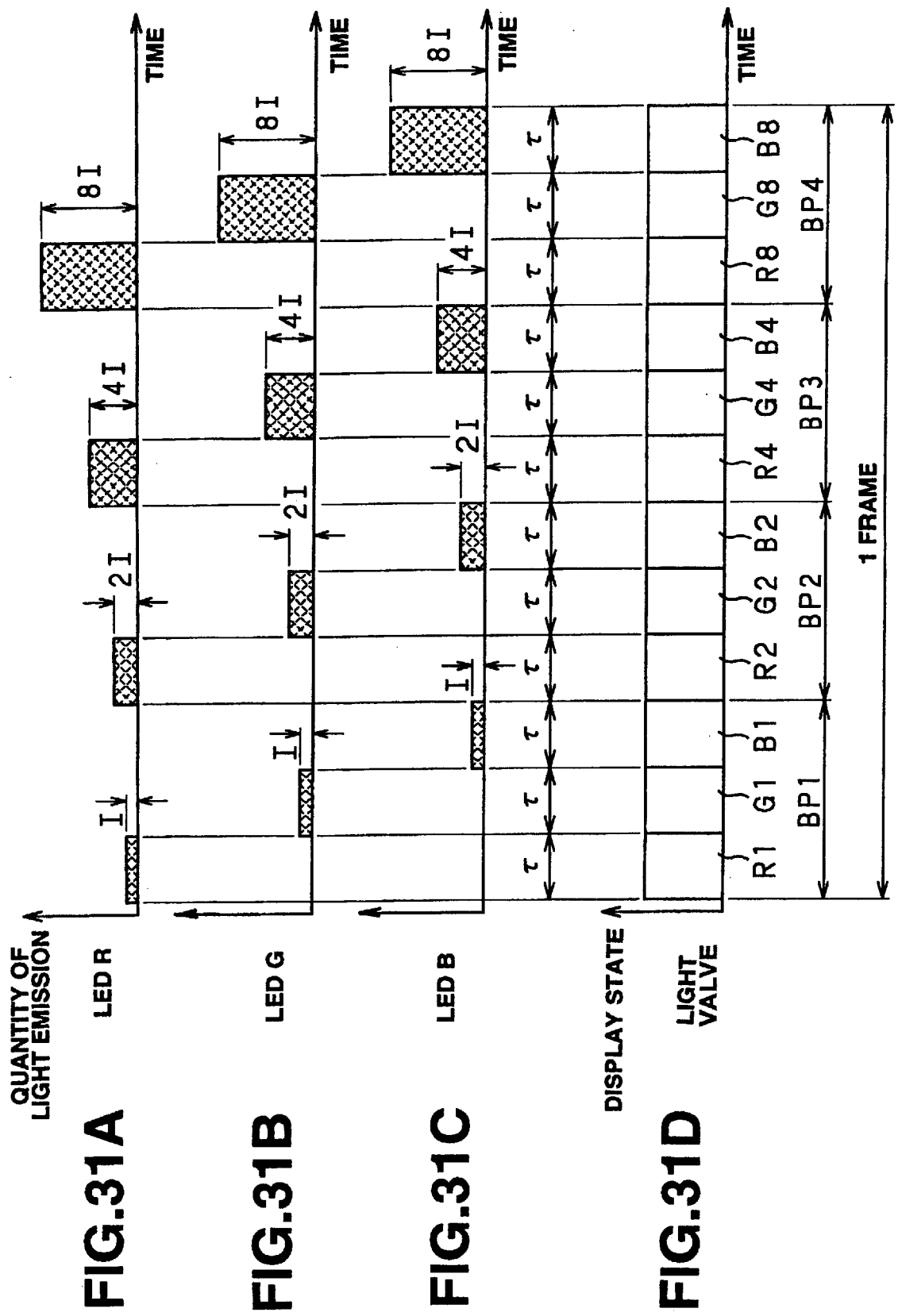

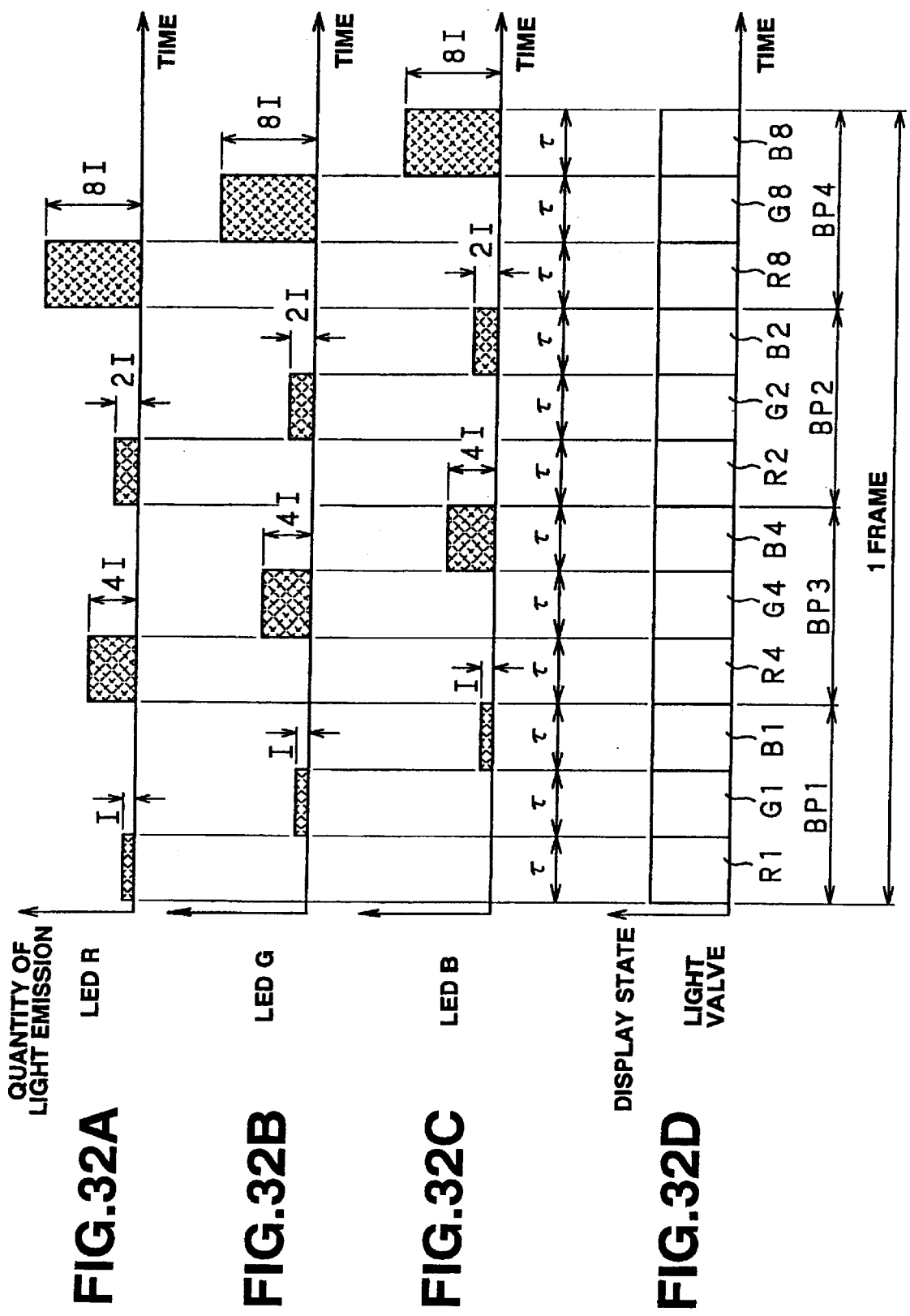

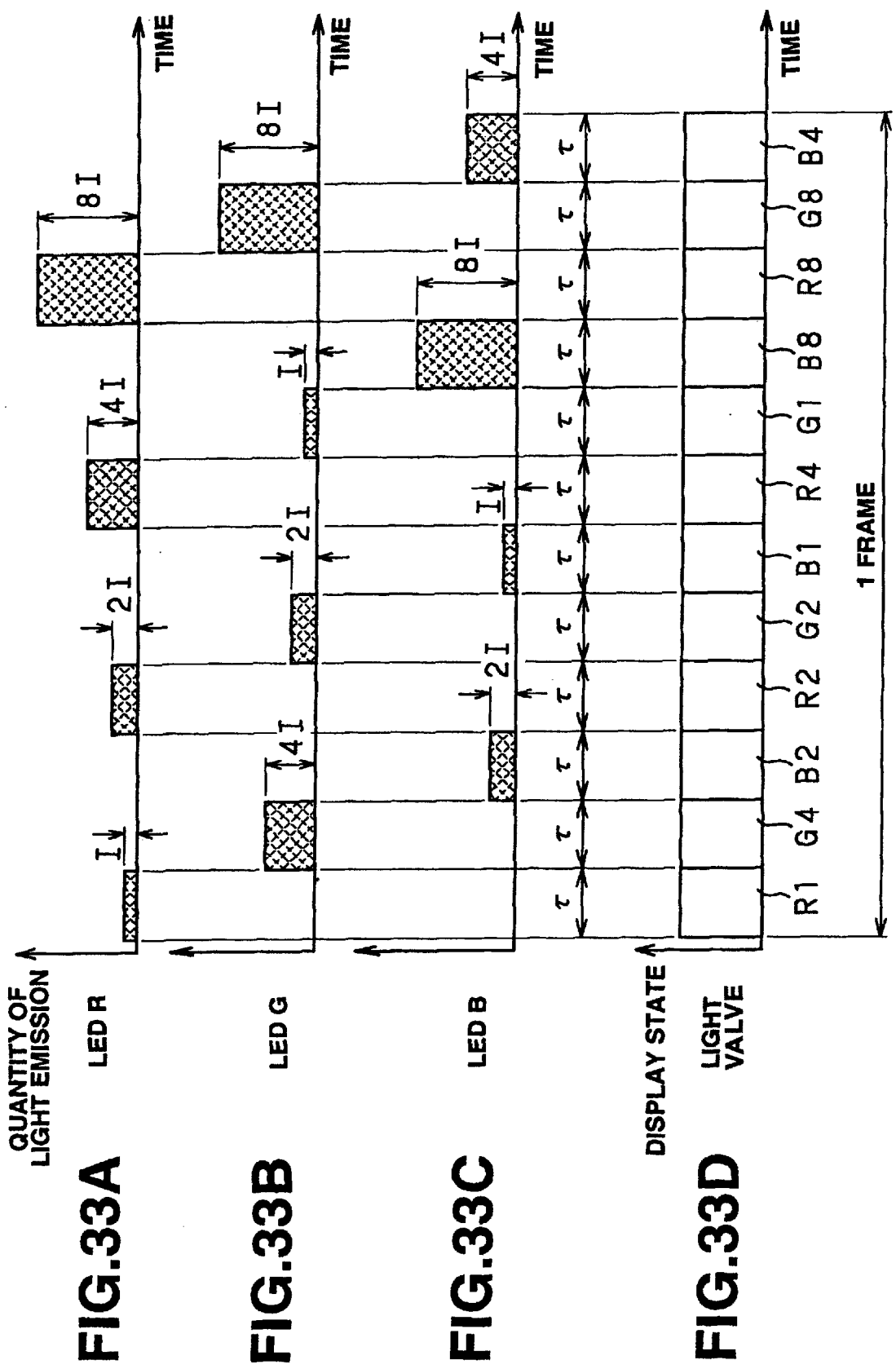

PICTURE DISPLAY APPARATUS FOR DISPLAYING A COLORED PICTURE

This is a continuation of application Ser. No. 09/046,497, filed on Mar. 23, 1998.

BACKGROUND OF THE INVENTION

1. Field of the Invention

This invention relates to a picture display method and apparatus for displaying a picture by spatially modulating the light outgoing from a light source and projecting the modulated light.

2. Description of the Related Art

Among picture display apparatus used for the purpose of appreciating a picture, there is a projection type picture display apparatus in which the light outgoing from a light source is spatially modulated by a picture display light valve for projection on a screen. This projection type picture display apparatus is classified into a front side projection type in which the picture is projected from the front side, such as a screen, and a back side projection type in which the picture is projected from the back side of the screen. As this projection type picture display apparatus, there is known such apparatus in which a white light source, including a discharge type xenon lamp, a metal halide lamp or a heat light emission type halogen lamp, is used as a light source, and a liquid crystal light valve is used as a picture display light valve.

FIG. 1 shows an illustrative structure of a conventional projection type picture display device. This projection type picture display device includes a lamp 201 emitting a white light beam, a UV-IR cutting filter, not shown, for cutting the ultraviolet light (UV light) and infrared light (IR light) of the light radiated from the lamp 201, and a lens 202 for condensing the light passed through the UV-IR cutting filter. This projection type picture display device also includes a red color separating mirror 203 reflecting only the red wavelength component of the light condensed by the lens 202 and transmitting other wavelength components, and a green color separating mirror 204 for reflecting only the green wavelength component passed through the red color separating mirror 203 and transmitting other wavelength components. The projection type picture display device also includes a blue color separating mirror 205 for reflecting only the blue wavelength component passed through the green color separating mirror 204 and transmitting other wavelength components. As the lamp 201, a white light source, such as a xenon lamp, a metal halide lamp or a halogen lamp, is used. As the mirrors 203 to 205, dichroic mirrors are used.

The projection type picture display device also includes a cubic-shaped synthesis prism 210, arranged for causing the green light reflected by the green color separating mirror 204 to fall on a surface 210G of the synthesis prism 210, and a reflection mirror 206 for causing the red light reflected by the red color separating mirror 203 to fall on a surface 210R of the synthesis prism 210 perpendicular to the surface 210G. The projection type picture display device also includes a reflection mirror 207 for reflecting the blue light reflected by the blue color separating mirror 205 so as to fall on a surface 210B of the synthesis prism parallel to the surface 210R of the synthesis prism 210.

The projection type picture display device also includes a red picture display light valve 211R arranged between the reflection mirror 206 and the surface 210R of the synthesis prism 210, and a green picture display light valve 211G arranged between the green color separating mirror 204 and the surface 210B of the synthesis prism 210. The projection type picture display device also includes a blue picture display light valve 211B arranged between the reflection mirror 207 and the surface 210B of the synthesis prism 210, and a projection lens 212 arranged facing a surface 210A parallel to the surface 210G of the synthesis prism 210. The light valves 211R, 211G and 211B may, for example, be rectangular in shape. The light valves 211R, 211G and 211B are adapted for being driven on the basis of red picture signals, green picture signals and blue picture signals, respectively.

The projection type picture display device also includes a red field lens 212R arranged between the reflection mirror 206 and the red picture display light valve 211R, and a green field lens 212G arranged between the green color separating mirror 204 and the green picture display light valve 211G. The projection type picture display device also includes a blue field lens 212B arranged between the reflection mirror 207 and the blue picture display light valve 211B, and an optical path length adjustment lens 213 arranged between the blue color separating mirror 204 and the blue color reflection mirror 205. The projection type picture display device also includes an optical path length adjustment lens 214 arranged between the blue color separating mirror 205 and the reflection mirror 207.

The synthesis prism includes a reflecting mirror 210r for reflecting only the red light incident from the surface 210R towards the surface 210R, and a reflecting surface 210B for reflecting only the blue light incident from the surface 210B towards the surface 210A.

The above-mentioned components of the projection type picture display apparatus are held by a suitable holder and installed in this state in a casing 214.

In the projection type picture display apparatus, shown in FIG. 1, the white light radiated from the lamp 201 is freed by the UV-IR cutting filter of redundant wavelength light beams, that is the UV and IR light beams, and condensed by the lens 202 so as to fall on the red color separating mirror 203. Of the light incident on the red color separating mirror 203, the red light is reflected by the red color separating mirror 203. The reflected red light is further reflected by the reflection mirror 206 to pass via red field lens 212R through the red picture display light valve 211R and is spatially modulated based on red picture signals so as to fall on the synthesis prism 210.

Of the light incident on the red color separating mirror 203, the light other than the red light is transmitted through the red color separating mirror 203 to fall on the green color separating mirror 204. Of the light incident on the green color separating mirror 204, the green light is reflected by the green color separating mirror 204 and transmitted via green field lens 212G through the green picture display light valve 211G and is spatially modulated based on red picture signals to fall on the synthesis prism 210.

Of the light incident on the green color separating mirror 204, the light other than the green light is transmitted through the green color separating mirror 204 to fall on the blue color separating mirror 205. Of the light incident on the blue color separating mirror 205, the blue light is reflected by the blue color separating mirror 205, reflected by the reflection mirror 207 through the optical path length adjustment lens 214 and transmitted via blue field lens 212B through the blue picture display light valve 211B and is spatially modulated based on blue picture signals to fall on the synthesis prism 210.

The light beams of respective colors, modulated by the light valves 211R, 211G and 211B, are synthesized by the synthesis prism 210 so as to be then radiated from the surface 210A to fall on the projection prism 212. The light beams are then projected to an enlarged scale on a transmission or reflection projection type picture display apparatus type screen 213.

The above-described conventional projection type picture display apparatus has a defect that, since the white light source (lamp), such as xenon lamp, metal halide lamp or halogen lamp, used as a light source, generally undergoes significant chronological changes, and is of short service life, the picture tends to become dark, while the lamp tends to be used up, such that the displayed picture tends to become dark or the lamp has to be exchanged during display of the picture.

On the other hand, the light beam radiated from the white light source used in the conventional projection type picture display apparatus is usually of a circular cross-section, whereas the picture display light valve is usually of an elongated shape. Thus, in the conventional projection type picture display apparatus, the diameter of the light beam radiated on the picture display light valve is set so as to be longer than the length of a diagonal of the light valve in order to illuminate the light from the white light source uniformly on the picture display light valve. The result is that much light is wasted to lower the utilization efficiency of light from the light source.

Moreover, the conventional projection type picture display apparatus has a defect that, because of the low utilization efficiency of light from the light source, a brighter light source needs to be used for obtaining the necessary brightness, and a defect that, since a larger light source needs to be used for realizing the necessary brightness, it becomes necessary to reduce the size of the projection type picture display apparatus.

In the projection type picture display apparatus, there are occasions wherein a picture of a given aspect ratio is switched to one of another aspect ratio, such as in the case of switching between display of a picture with the aspect ratio of 3:4 of the NTSC (National Television System Commission) and display of a picture with the aspect ratio of 9:16 of the hi-vision system. In this case, the shape and the area of an area actually used in the picture display light valve are changed depending on the aspect ratio. With the conventional projection type picture display apparatus, if the shape and the area of an area actually used in the picture display light valve are changed, the light volume effectively used in the projection type picture display apparatus is also changed, as a result of which the brightness of the projected picture is also changed.

With the conventional projection type picture display apparatus, the outgoing light beam of the white light source is color-separated by color separation means, such as a dichroic mirror, and the resulting separated light beams are illuminated on picture display light valves associated with the respective color signals. The result is that the wavelength distribution of the separated colors depends on the wavelength distribution of the outgoing light of the original white light source to make difficult optimum color reproduction.

Moreover, in the white light source used in the conventional projection type picture display apparatus, brightness modulation is generally not possible or only narrow in brightness adjustment range, with the response time of brightness modulation being longer, such that, in the conventional projection type picture display apparatus, the displayed picture cannot be adjusted in brightness or can be adjusted only in a narrow range.

Also, if, in the conventional projection type picture display apparatus, the radiated light of the white light source is color-separated by, for example, a dichroic mirror so as to be illuminated on picture display light valves associated with respective color signals, it is difficult to adjust brightness of the light from one color to another. Further, in the conventional projection type picture display apparatus of the type in which color filters are provided in the picture display light valves for color separation, color adjustment can be done only by adjusting the picture signals associated with respective colors or by changing color filters used. Thus, with the conventional projection type picture display apparatus, fine color adjustment is difficult or can be realized only in a narrow range.

SUMMARY OF THE INVENTION

It is therefore an object of the present invention to provide a picture display method and apparatus in which the light source is durable and can reproduce colors optimally and in which the light utilization efficiency can be improved to make possible reduction of power consumption and reduction in size of the apparatus.

It is another object of the present invention to provide a picture display method and apparatus in which the light source is durable and can reproduce colors optimally and in which brightness or color can be adjusted easily.

In one aspect, the present invention provides a picture display apparatus including spatial modulation means for spatially modulating an illuminated light beam in accordance with the information of a displayed picture for forming a picture, a light source employing a light-emitting diode radiating the light beam illuminated on the spatial modulation means, a projection optical system for projecting the light beam modulated by the spatial modulation means and light beam shape setting means for converting the cross-sectional profile of the light beam radiated by the light source to be illuminated on the spatial modulation means to a profile corresponding to the profile of a picture forming area in the spatial modulation means.

With the present picture display apparatus, the light beam radiated from the light source comprised of light-emitting diodes has its cross-sectional profile converted by light beam shape setting means to a cross-sectional profile in meeting with the profile of a picture forming area in spatial modulation means so as to be illuminated on spatial modulation means. The spatial modulation means spatially modulates the illuminated light in keeping with the information of the displayed picture to from a picture. The light modulated by spatial modulation means is projected by a projection optical system on a screen or on an eye of a viewer.

In another aspect, the present invention provides a picture display apparatus including spatial modulation means for spatially modulating an illuminated light beam in accordance with the information of a displayed picture for forming a picture, a light source employing a light-emitting diode radiating the light beam illuminated on the spatial modulation means, a projection optical system for projecting the light beam modulated by the spatial modulation means and brightness adjustment means for adjusting brightness of the light radiated by the light source.

With the present picture display apparatus, the light radiated by the light source employing light-emitting diodes is illuminated on and spatially modulated by spatial modulation means in accordance with the information of the displayed picture to form a picture. The light modulated by the spatial modulation means is projected by a projection optical system on a screen or on the eye of the viewer. The light radiated by the light source is adjusted by brightness adjustment means.

In a further aspect, the present invention provides a picture display apparatus for displaying a colored picture having gradation in brightness by time-divisional display of a plurality of monochromatic pictures, wherein the monochromatic pictures having different display colors are sequentially displayed so that monochromatic pictures of the same color are not displayed consecutively.

In yet another aspect, the present invention provides a picture display method for displaying a colored picture having gradation in brightness by time-divisional display of a plurality of monochromatic pictures, wherein the monochromatic pictures having different display colors are sequentially displayed so that monochromatic pictures of the same color are not displayed consecutively.

In the picture display method and apparatus, monochromatic pictures with different display colors are sequentially displayed. These monochromatic pictures are contiguously displayed so that a color picture is recognized due to the after-image effect proper to the human viewing system. Since the monochromatic pictures of the same color are configured so as not to be displayed consecutively, color splitting or the edge chromatic phenomenon is not likely to be produced even if a color picture is displayed by time-divisional representation of plural monochromatic pictures, thus assuring satisfactory color reproduction.

BRIEF DESCRIPTION OF THE DRAWINGS

FIGS. 17A, 17B, 17C, 17D illustrate the operation of the picture display apparatus according to the fifth embodiment of the present invention.

FIGS. 19A, 19B, 19C, 19D illustrate the operation of the picture display apparatus according to the sixth embodiment of the present invention.

FIGS. 26A, 26B, 26C and 26D illustrate a typical operation of the picture display apparatus according to the present invention.

FIGS. 27A, 27B, 27C and 27D illustrate another typical operation of the picture display apparatus according to the present invention.

FIGS. 28A, 28B, 28C and 28D illustrate still another typical operation of the picture display apparatus according to the present invention.

FIGS. 29A, 29B, 29C and 29D illustrate a further typical operation of the picture display apparatus according to the present invention.

FIGS. 30A, 30B, 30C and 30D illustrate a further typical operation of the picture display apparatus according to the present invention.

FIGS. 31A, 31B, 31C and 31D illustrate a further typical operation of the picture display apparatus according to the present invention.

FIGS. 32A, 32B, 32C and 32D illustrate a further typical operation of the picture display apparatus according to the present invention.

FIGS. 33A, 33B, 33C and 33D illustrate yet another typical operation of the picture display apparatus according to the present invention.

DESCRIPTION OF PREFERRED EMBODIMENTS

Figure 1:
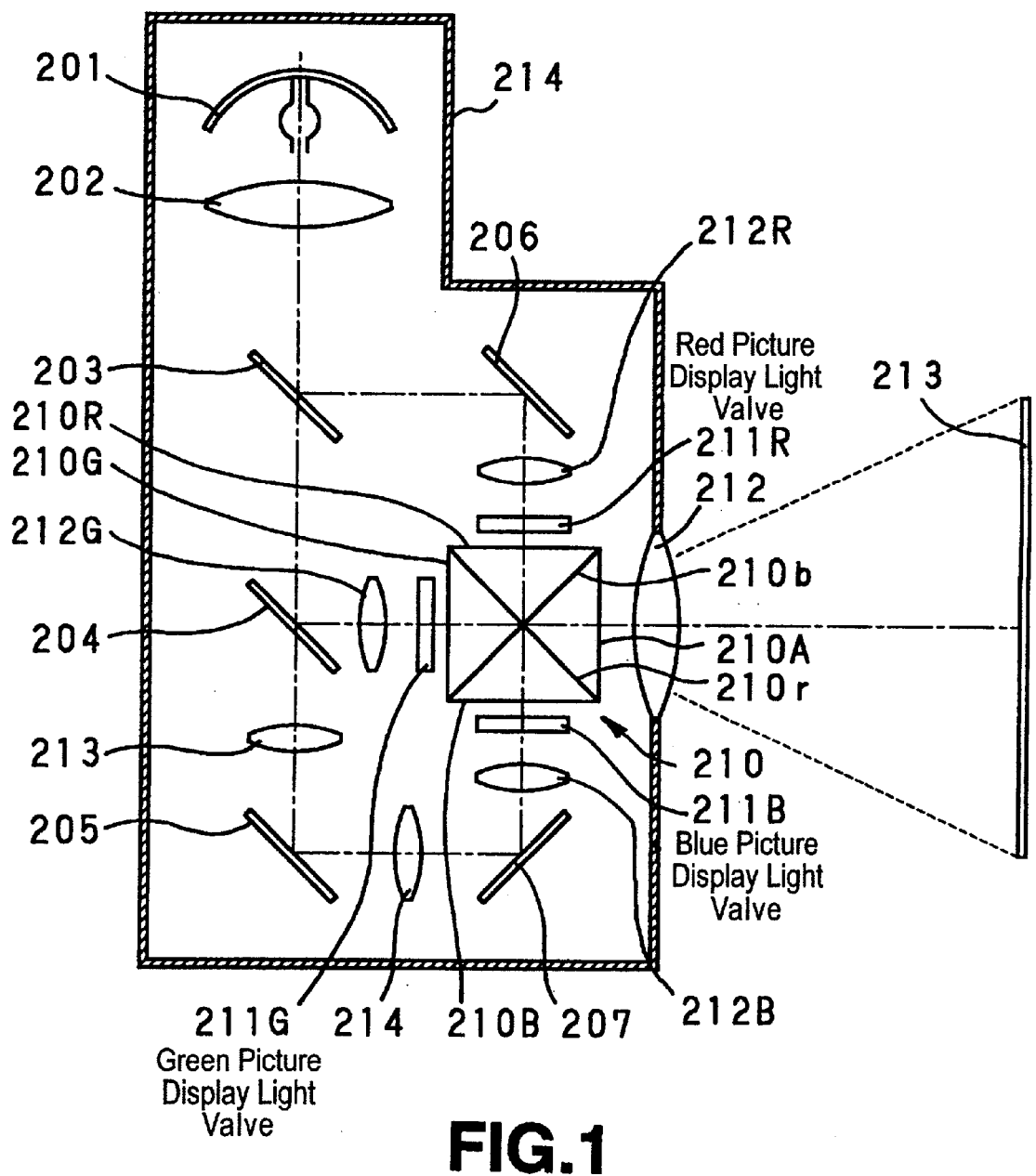
FIG. 1 is a schematic view showing an illustrative structure of a conventional picture display apparatus.

Referring to the drawings, preferred embodiments of the present invention will be explained in detail.

Figure 2:
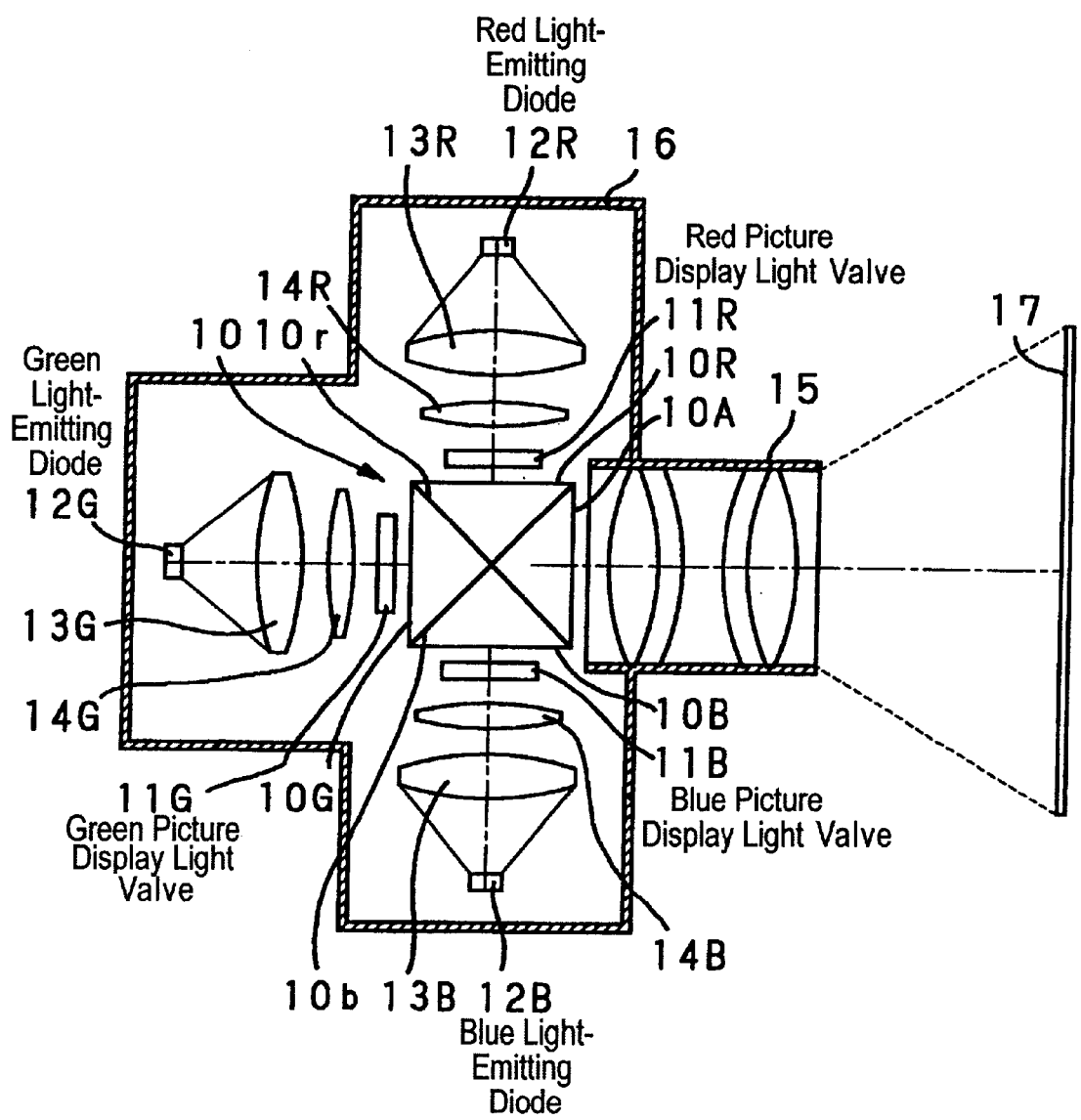
FIG. 2 is a schematic view for illustrating the structure of a picture display apparatus according to a first embodiment of the present invention.

FIG. 2 is a schematic view for illustrating the structure of a projection type picture display device according to a first embodiment of the present invention. This picture display device includes a cubic-shaped synthesis prism 10, a green picture display light valve 11G arranged for facing a surface 10G of the synthesis prism 10, a red picture display light valve 11R arranged for facing a surface 10R extending perpendicular to the surface 10G of the synthesis prism 10, and a blue picture display light valve 11B arranged for facing a surface 10B extending parallel to the surface 10R of the synthesis prism 10. The picture display light valves 11R, 11G and 11B correspond to spatial modulation means in the present invention.

The picture display device further includes red light-emitting diode 12R, a green light-emitting diode 12G and a blue light-emitting diode 12b, arranged laterally of the picture display light valves 11R, 11G and 11B for operating as light sources for illuminating red, green and blue illuminating light beams to the picture display light valves 11R, 11G and 11B, respectively. The red, green and blue illuminating light beams herein mean light beams with certain wavelength distribution, instead of the sole wavelength light beam.

There are sequentially arrayed, between the red light-emitting diode 12R and the red picture display light valve 11R, a red relay lens 13R and a red field lens 14R, beginning from the side of the red light-emitting diode 12R. There are similarly arrayed, between the green light-emitting diode 12G and the green picture display light valve 11G, a green relay lens 13G and a green field lens 14G, beginning from the side of the green light-emitting diode 12G. There are also arrayed, between the blue light-emitting diode 12B and the blue picture display light valve 12B, a blue relay lens 13B and a blue field lens 14B, beginning from the side of the blue light-emitting diode 12B.

The picture display device also includes a projection lens 15 formed by picture display light valves 11R, 11G and 11B for facing a surface 10A of the synthesis prism 10 parallel to its surface 10G and which is adapted for projecting the light of an image synthesized by the synthesis prism 10 on a transmission type or reflection type screen 17 in case of a back surface projection type picture display device or a front surface projection type picture display device, respectively. The above-mentioned various constituent elements are held by a suitable holder and mounted in this state in a casing 16.

The synthesis prism 10 is comprised of a dichroic prism having a reflective surface 10r for reflecting only a red light beam incident from the surface 10R towards the surface 10A and a reflective surface 10B for reflecting only a blue light beam incident from the surface 10B towards the surface 10A.

The picture display light valves 11R, 11G and 11B are transmission type liquid crystal light valves each having a large number of pixels capable of controlling light transmissivity. These picture display light valves 11R, 11G and 11B use liquid crystals, such as twisted nematic (TN), super twisted nematic (STN) or FLC (ferroelectric liquid crystal). These picture display light valves 11R, 11G and 11B may be driven in accordance with the active matrix system or with the simple matrix system. If the active matrix system is used, a thin film transistor (TFT) or a metal insulator metal (MIM) is used as a switching device.

A red light-emitting diode employing an AlGaAs or AlGaInP based compound semiconductor is used as the red light-emitting diode 12R, while a green light-emitting diode and a blue light-emitting diode employing a GaInN based or a ZnSe based compound semiconductor are used as the green light-emitting diode 12G and the blue light-emitting diode 12B, respectively.

The relay lenses 13R, 13G and 13B are lenses for forming two-dimensional images of light radiating portions of the light-emitting diodes 12R, 12G and 12b on the picture display light valves 11R, 11G and 11B, respectively. The field lenses 14R, 14G and 14B are lenses for forming images of the back focal plane of the relay lenses 13R to 13B at the position of the incident pupil of the projection lens 15.

Figure 4A:
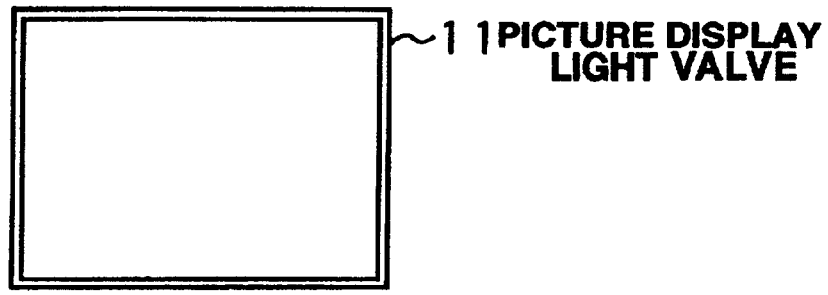
FIGS. 4A, 4B and 4C are schematic views for illustrating the shape of an example of a picture display light valve shown in FIG. 2.
Figure 4B:
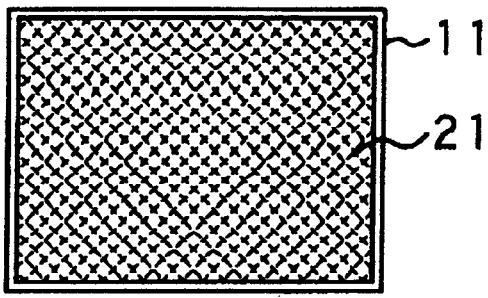
Figure 4C:
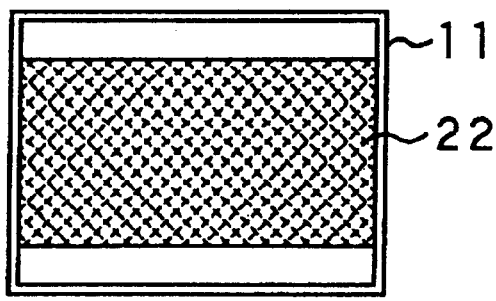

FIG. 4 shows an illustrative shape of the picture display light valve 11 (being a generic appellation for 11R to 11B). The picture display light valve 11 in the present embodiment has an aspect ratio of 3:4, as shown in FIG. 4A. Although the picture display light valve 11 has a diagonal length of 1.3 inches (approximately 33 mm), it may be of a smaller or a larger size. With the picture display light valve 11, shown in FIG. 4, the entire area of the light valve may be a picture forming area 21 to form a picture having an aspect ratio 3:4 as in the NTSC system, as shown in FIG. 4B, or an area of the light valve excluding part of upper and lower edges thereof may be a picture forming area 22 to form a picture having an aspect ratio 9:16 as in the hi-vision system, as shown in FIG. 4C.

Figure 5A:
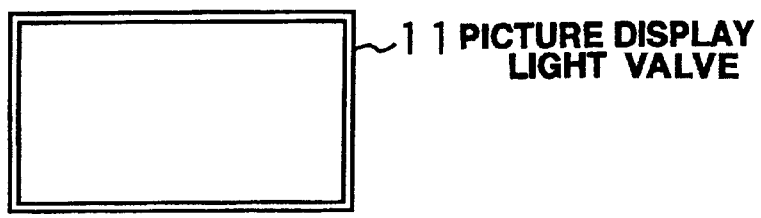
FIGS. 5A, 5B and 5C are schematic views for illustrating the shape of another example of a picture display light valve shown in FIG. 2.
Figure 5B:
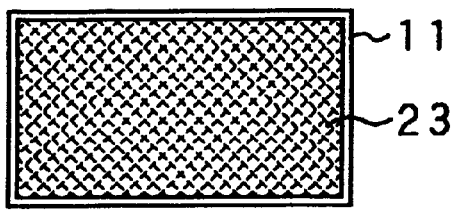
Figure 5C:
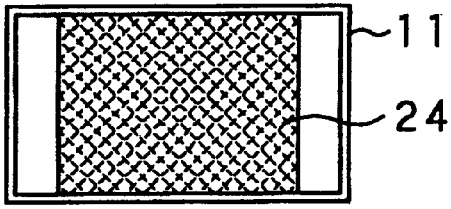

FIG. 5 shows another illustrative shape of the picture display light valve 11. The picture display light valve 11 in the present embodiment has an aspect ratio of 9:16, as shown in FIG. 5A. With the picture display light valve 11, shown in FIG. 4, the entire area of the light valve may be a picture forming area 23 to form a picture having an aspect ratio 9:16, as shown in FIG. 5B, or an area of the light valve excluding part of left and right edges thereof may be a picture forming area 24 to form a picture having an aspect ratio 3:4, as shown in FIG. 5C.

FIG. 6 illustrates a typical shape of the light-emitting diode 12 (being a generic appellation of 12R, 12G and 12B). In the present embodiment, the light beam illuminated on the picture forming area in the picture display light valve 11 is selected to correspond in shape to the picture forming area in the picture display light valve 11 so that the cross-sectional shape of the light beam illuminated on the picture forming area in the picture display light valve 11 will correspond to the shape of the picture display light valve 11.

Figure 6A:
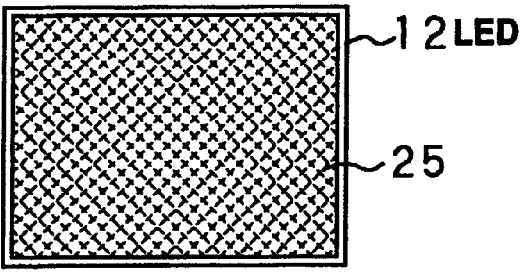
FIGS. 6A, 6B are schematic views for illustrating the shape of a light emitting diode shown in FIG. 2.

The light radiating portion of the light radiating portion 25 of the light-emitting diode 12 shown in FIG. 6A is shaped to correspond to the aspect ratio of 3:4. The light-emitting diode 12 of the present embodiment is used when the shape of the light radiating portion 25 is the same as or similar to the picture forming area 24 shown in FIG. 5C and when it is desired to form a picture with the aspect ratio of 3:4 by the picture display light valve 11 as shown in FIGS. 4B or 5C.

Figure 6B:
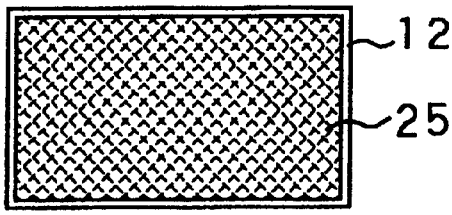

The light radiating portion of the light radiating portion 25 of the light-emitting diode 12 shown in FIG. 6B is shaped to correspond to the aspect ratio of 9:16. The light-emitting diode 12 of the present embodiment is used when the shape of the light radiating portion 25 is the same as or similar to the picture forming area 24 shown in FIG. 5B and when it is desired to form a picture with the aspect ratio of 9:16 by the picture display light valve 11 as shown in FIGS. 4C or 5B.

The shape of the picture display light valve 11 may be of any suitable shape without being limited to the aspect ratio of 3:4 or 9:16 as shown in FIGS. 4 and 5. The shape of the picture forming area in the picture display light valve 11 may also be of any suitable shape without being limited to the aspect ratio of 3:4 or 9:16. In any case, the shape of the light radiating portion of the light-emitting diode 12 is set so that the cross-sectional shape of the light beam illuminated on the picture forming area in the picture display light valve 11 will correspond to the shape of the picture forming area.

Meanwhile, the shape of the light radiating portion is not necessarily the same as or similar to the shape of the picture forming area. This will be explained with reference to FIG. 7 showing the results of experimentation as to the relation between the shape of the light radiating portion of the light source and the shape of the illuminating light in the picture display light valve 11.

Figure 7A:
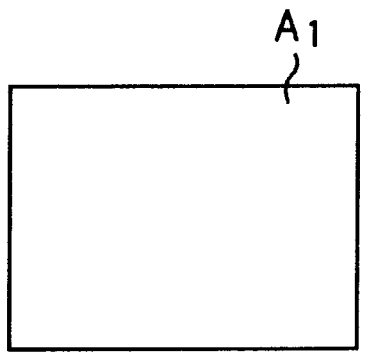
FIGS. 7A, 7B, 7C, 7D, 7E and 7F are schematic views showing the results of an experiment conducted for scrutinizing into the relation between the shape of the light radiating portion of the light source and the shape of the illuminating light on the picture display light valve.
Figure 7B:
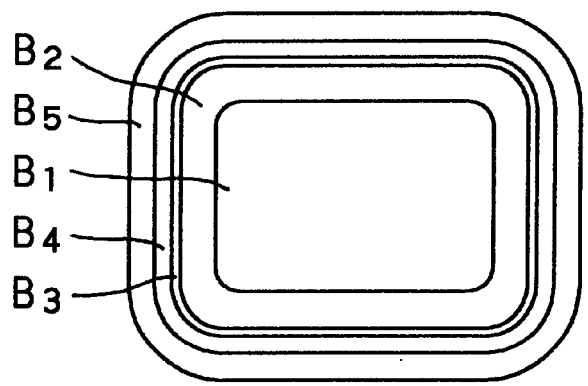
Figure 7C:
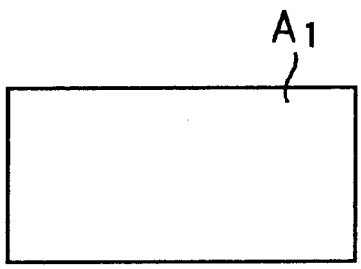
Figure 7D:
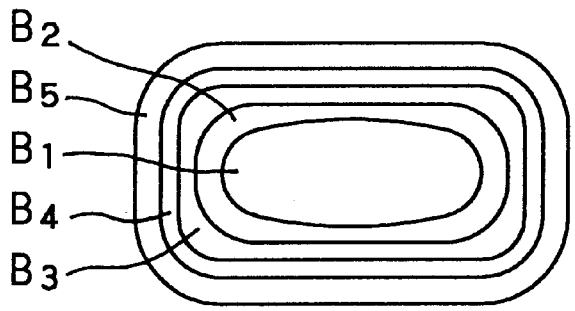
Figure 7E:
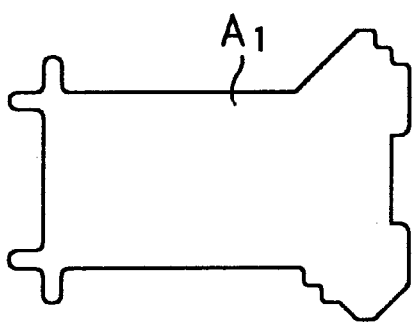
Figure 7F:
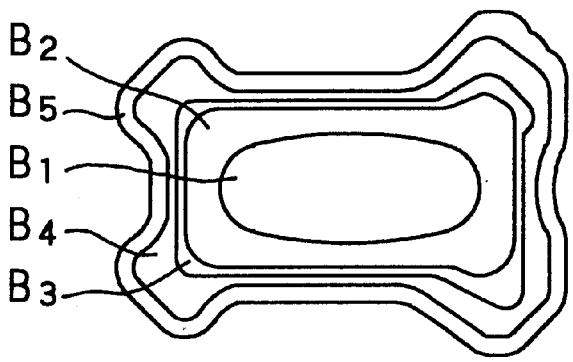

Specifically, FIG. 7A shows the light emitting state of a light source when the light radiating portion has the shape of a rectangle having an aspect ratio of 3:4, while FIG. 7B shows the illuminated state on the picture display light valve 11 in such case. Similarly, FIG. 7C shows the light emitting state of a light source when the light radiating portion has the shape of a rectangle having an aspect ratio of 9:16, while FIG. 7D shows the illuminated state on the picture display light valve 11 in such case. On the other hand, FIG. 7E shows the light emitting portion and the illuminating state of the light source in case the light radiating portion of the light source is preferably shaped so as to be swollen outwards at the corners of the rectangle. FIG. 7F shows the illuminated state of the picture display light valve 11 in this case. In FIGS. 7A, 7C and 7E, A1 denotes an area of uniform brightness. In FIGS. 7B, 7D and 7F, B1 to B5 denotes an area with brightness in terms of a relative value of not less than 0.9 and not larger than 1, an area with brightness in terms of a relative value of not less than 0.8 and less than 0.9, an area with brightness in terms of a relative value of not less than 0.7 and less than 0.8, an area with brightness in terms of a relative value of not less than 0.3 and less than 0.7, an area with brightness in terms of a relative value of not less than 0.1 and less than 0.3, respectively.

It is seen from FIGS. 7A to 7D that, if the light radiating portion of the light source is rectangular in shape, the illuminated light on the picture display light valve 11 is also rectangular with rounded corners. Thus, if the picture forming area in the picture display light valve 11 is rectangular, the state of the light radiating portion of the light source is preferably shaped so as to be swollen outwards at the corners of the rectangle as shown in FIG. 7E since then the shape of illuminating light is closer to a rectangular shape. That is, the shape of the light radiating portion of the light source is desirably set in an appropriate manner so that the cross-sectional shape of the light beam illuminated on the picture forming area on the picture display light valve 11 will correspond to the shape of the picture forming area.

Figure 3:
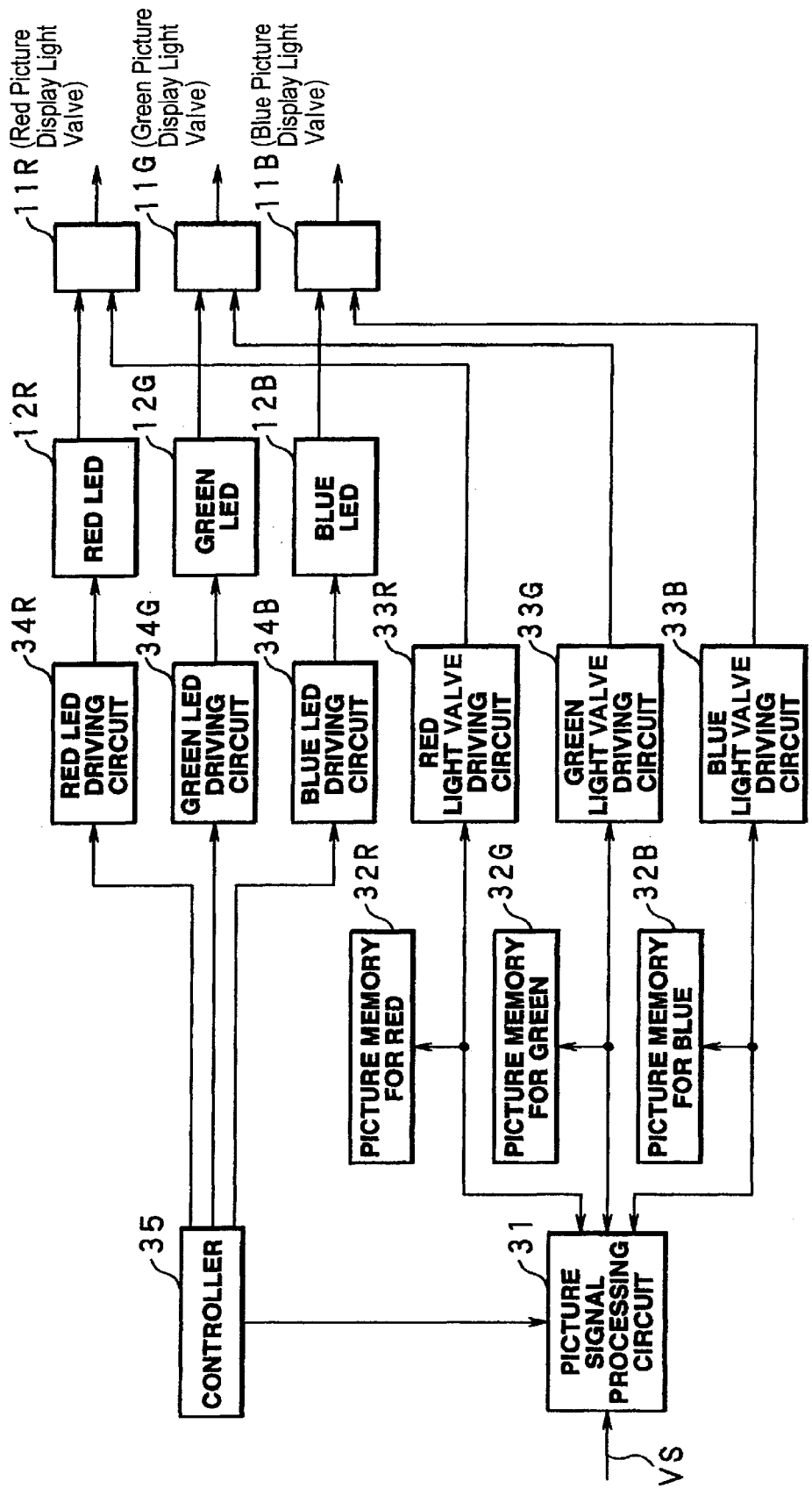
FIG. 3 is a block circuit diagram for illustrating the structure of the picture display apparatus according to the first embodiment of the present invention.

FIG. 3 is a block diagram showing the circuit structure of a picture display device of the present embodiment. Referring to FIG. 3, the present embodiment of the picture display device includes a picture signal processing circuit 31 to which is entered a picture signal VS and which generates a red picture signal, a green picture signal and a blue picture signal corresponding to the red picture, a green picture and a blue picture, respectively. The picture display device also includes a red picture memory 32R, a green picture memory 32G and a blue picture memory 32B for transiently storing the red picture signal, green picture signal and the blue picture generated by the picture signal processing circuit 31. The picture display device also includes a red light valve driving circuit 33R connected to the picture signal processing circuit 31 and to the red picture memory 32R for driving a red picture displaying light valve 11R, a green light valve driving circuit 33G connected to the picture signal processing circuit 31 and to the green picture memory 32G for driving a green picture displaying light valve 11G and a blue light valve driving circuit 33B connected to the picture signal processing circuit 31 and to the blue picture memory 32B for driving a blue picture displaying light valve 11B.

The picture display device also includes a red light-emitting diode driving circuit 34R for driving the red light-emitting diode 12R, a green light-emitting diode driving circuit 34G for driving the green light-emitting diode 12G and a blue light-emitting diode driving circuit 34B for driving the blue light-emitting diode 12B. In the drawing, the light-emitting diode is denoted as LED. The picture display device further includes a controller 35 for controlling the picture signal processing circuit 31 and the light-emitting diode driving circuits 34R, 34G and 34B. The controller 35 may, for example, be comprised of a microcomputer.

The light-emitting diode driving circuits 34R, 34G and 34B include means for switching the variable resistor or resistor for varying the voltage applied across the light-emitting diodes 12R, 12G and 12B for independently adjusting the brightness of the light radiated from the light-emitting diodes 12R to 12B.

The operation of the picture display device of the present embodiment is hereinafter explained.

Referring to FIG. 3, the picture signal VS is entered to the picture signal processing circuit 31 which then generates a red picture signal, a green picture signal and a blue picture signal to be stored in the red picture memory 32R, green picture memory 32G and in the blue picture memory 32B, respectively. The light valve driving circuits 33R, 33G and 33B read out the respective color picture signals at a pre-set period from the picture memories 32R, 32G and 32B to drive the picture display light valves 11R, 11G and 11B, based on the read-out picture signals, respectively.

The light-emitting diode driving circuits 34R, 34G and 34B drive the light-emitting diodes 12R, 12G and 12B for perpetually or suitably lighting the light-emitting diodes 12R, 12G and 12B, respectively.

Referring to FIG. 2, the uniform red illuminating light radiated from the red light-emitting diode 12R is illuminated via relay lens 13R and field lens 14R on a red picture display light valve 11R so as to be thereby spatially modulated in intensity to fall on the synthesis prism 10. Similarly, the uniform green illuminating light radiated from the green light-emitting diode 12G is illuminated via relay lens 13G and field lens 14G on a green picture display light valve 11G so as to be thereby spatially modulated in intensity to fall on the synthesis prism 10, while the uniform blue illuminating light radiated from the blue light-emitting diode 12B is illuminated via relay lens 13B and field lens 14B on a blue picture display light valve 11B so as to be thereby spatially modulated in intensity to fall on the synthesis prism 10.

The light beams of the respective colors, modulated by the picture display light valves 11R, 11G and 11B, are synthesized by the synthesis prism 10 so as to be radiated from the surface 10A to be projected on the screen 17 by the projection lens 15 to an enlarged scale to display a color picture on the screen 17.

With the present embodiment of the picture display device, as described above, the light source is improved in durability by employing the light-emitting diode 12 as the light source, thus saving the labor of exchanging the light sources. Also, since the wavelengths of the radiated light beams of the light-emitting diodes 12R, 12G and 12B are of a narrow range, the wavelength distribution of the various colors is not dependent on the wavelength distribution of the radiated light beam of the white light source, as occurs when color-separating the radiated light beam of the white light source. Thus, the range of the colors that can be represented by the synthesis of the outgoing light beams of the light-emitting diodes 12R, 12G and 12B is broader thus enabling optimum color reproduction. Moreover, since the light-emitting diode consumes less power and is of a smaller size than the white light source, the power consumption can be reduced as compared to the case of using the white light source as the light source thus enabling reduction in size of the picture display device.

In addition, in the present embodiment of the picture display device, since the light radiating portion of the light-emitting diode 12 has a shape corresponding to the shape of the picture forming area of the picture display light valve 11, specifically, the same shape or the similar shape, and hence the cross-sectional shape of the light beam illuminated on the picture forming area corresponds to the shape of the picture forming area, the light utilization efficiency is improved as compared to the case of using the white light source which gives a circular cross-section of the light beam, thus further saving the power consumption and reducing the size of the device.

With the picture display device of the present embodiment, the light radiated by the light-emitting diodes 12R, 12G and 12B can be adjusted independently this broadening the color adjustment range as compared to the conventional system. If the light-emitting diodes 12R, 12G and 12B differ in efficiency from color to color, the applied voltage or the injected current to the light-emitting diodes 12R, 12G and 12B can be previously varied by the light-emitting diode driving circuits 34R, 34G and 34B for independently adjusting the brightness of the light radiated by the light-emitting diodes 12R, 12G and 12B in order to set the color temperatures of the white picture screen to, for example, 9300° or 6500°. It is also possible for the viewer to adjust the brightness of the light beam radiated by the light-emitting diodes 12R, 12G and 12b to make color adjustment to suit to his or her liking.

Referring to FIGS. 8 and 9, the picture display device according to the second embodiment of the present invention is explained.

In the present embodiment of the picture display device, plural light source devices 42, each comprised of plural light-emitting diodes having respective planar light radiating portions, are provided in place of the sole light-emitting diode 12 according to the previous embodiment. These light-emitting diodes are selectively driven so that the cross-sectional shape of the light beam radiated from the light source device 42 will correspond to the shape of the picture forming area of the picture display light valve 11. The light source device 42 used in place of the light-emitting diode 12R is made up of plural red light-emitting diodes, while the light source device 42 used in place of the light-emitting diode 12G is made up of plural green light-emitting diodes 12G and the light source device 42 used in place of the light-emitting diode 12B is made up of plural blue light-emitting diodes 12B. In the present embodiment, the light-emitting diode driving circuits 34R, 34G and 34B of various colors in FIG. 2 can selectively drive plural light-emitting diodes provided in the associated color light source devices 42.

Figure 8A:
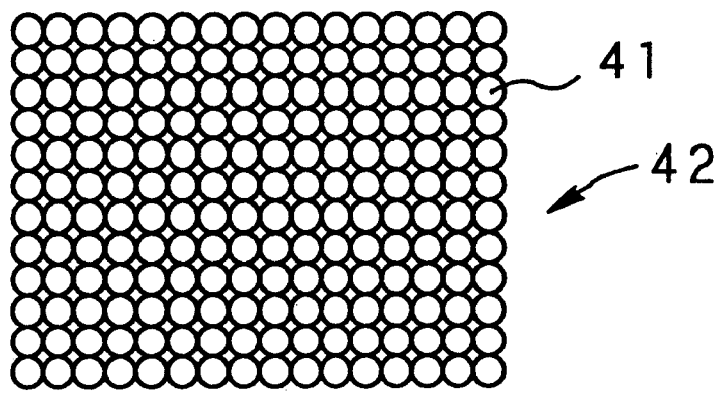
FIGS. 8A, 8B and 8C are schematic views showing an illustrative arrangement of the light emitting diodes of the light source device in the picture display device according to the second embodiment of the present invention.
Figure 8B:
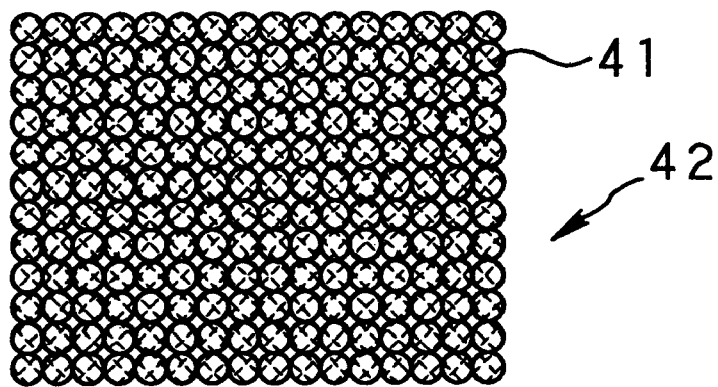
Figure 8C:
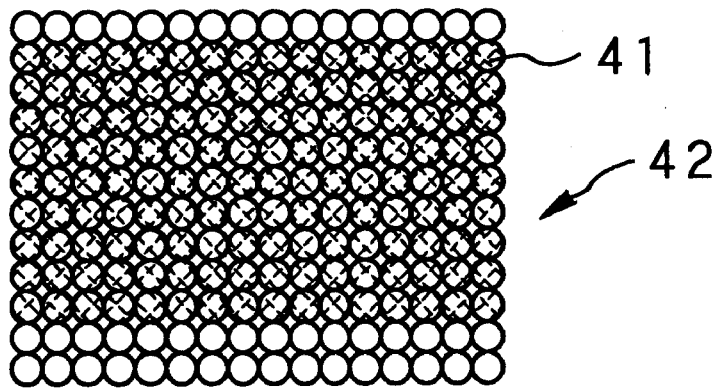

FIG. 8A shows an illustrative arrangement of plural light-emitting diodes in the light source device 42. In the light source device 42 of the instant embodiment, light-emitting diodes 41 having circular-shaped planar light-emitting portions are arrayed in 12 (vertical direction)×16 (horizontal direction) matrix configuration. With the present light source device 42, all light-emitting diodes 41 can be driven, as shown in FIG. 8B, so that the light radiating portion of the light source device 42 will be rectangular with the aspect ratio of 3:4. In addition, 9 column of the light-emitting diodes 41, excluding upper and lower three columns of the entire light-emitting diodes 41, may be selectively driven so that the light radiating portion of the light source device 42 will be rectangular with the aspect ratio of 9:16. The light-emitting state shown in FIG. 8B is used when forming a picture having the aspect ratio of 3:4 by the picture display light valve 11, while the light-emitting state shown in FIG. 8C is used when forming a picture having the aspect ratio of 9:16 by the picture display light valve 11.

Figure 9A:
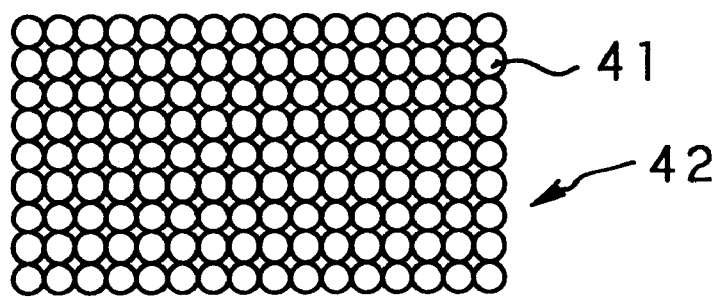
FIGS. 9A, 9b and 9C are schematic views showing another illustrative arrangement of the light emitting diodes of the light source device in the picture display device according to the second embodiment of the present invention.
Figure 9B:
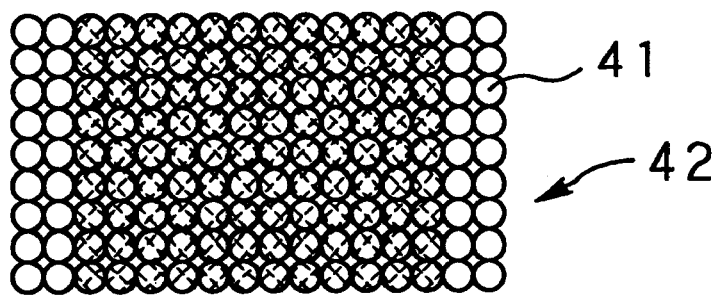
Figure 9C:
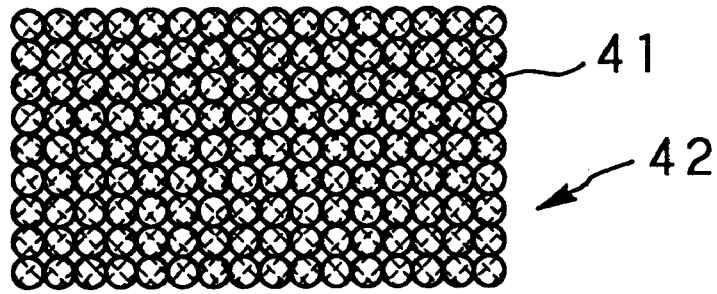

FIG. 9A shows an illustrative arrangement of plural light-emitting diodes in the light source device 42. In the light source device 42 of the instant embodiment, light-emitting diodes 41 having circular-shaped planar light-emitting portions are arrayed in a 9 (vertical direction)×16 (horizontal direction) matrix configuration. With the present light source device 42, all light-emitting diodes 41 can be driven, as shown in FIG. 9C, so that the light radiating portion of the light source device 42 will be rectangular with the aspect ratio of 9:16. In addition, 12 column of the light-emitting diodes 41, excluding upper and lower four columns of the entire light-emitting diodes 41, may be selectively driven so that the light radiating portion of the light source device 42 will be rectangular with the aspect ratio of 3:4. The light-emitting state shown in FIG. 9B is used when forming a picture having the aspect ratio of 3:4 by the picture display light valve 11, while the light-emitting state shown in FIG. 9C is used when forming a picture having the aspect ratio of 9:16 by the picture display light valve 11.

The arrangement of the plural light-emitting diodes 41 in the light source device 42 may be set optionally without being limited to the examples shown in FIGS. 8A or 9A. The shape of the light radiating portion in the light source device 42 formed by selectively driving plural light-emitting diodes may also be optionally set to suit to the shape of the picture forming area in the picture display light valve 11 without being limited to the examples shown in FIGS. 8B, 8C or 9B, 9C.

With the picture display device of the present embodiment, the shape of the light radiating portion in the light source device 42 can be optionally set by selectively driving the plural light-emitting diodes 41 provided in the light source device 42. This makes it possible to have the light source device 42 cope with various shapes of the picture forming areas in the picture display light valve 11. The structure and the operation of the present embodiment are otherwise the same as those of the first embodiment.

Figure 10:
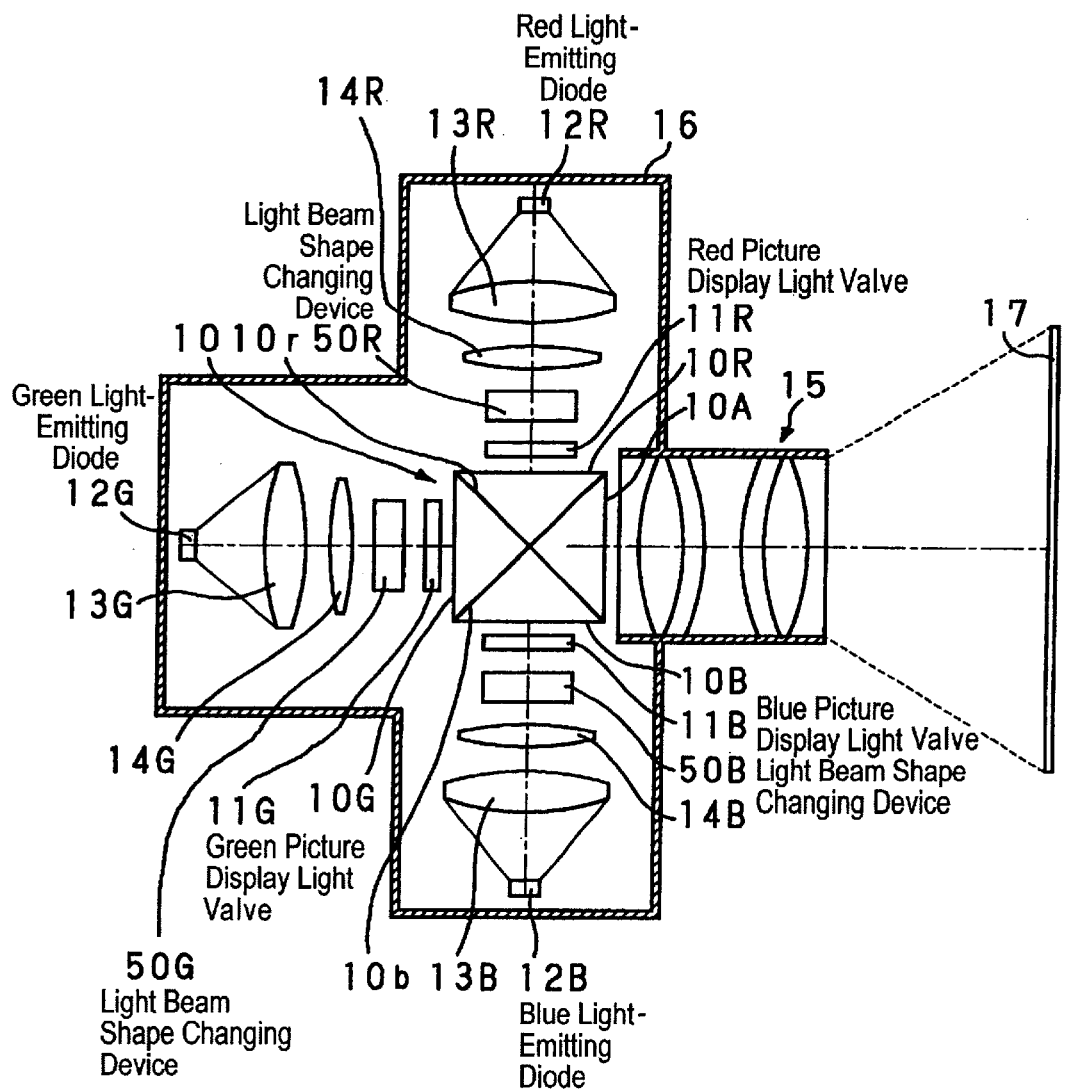
FIG. 10 is a schematic view for illustrating the structure of a picture display apparatus according to a third embodiment of the present invention.
Figure 11:
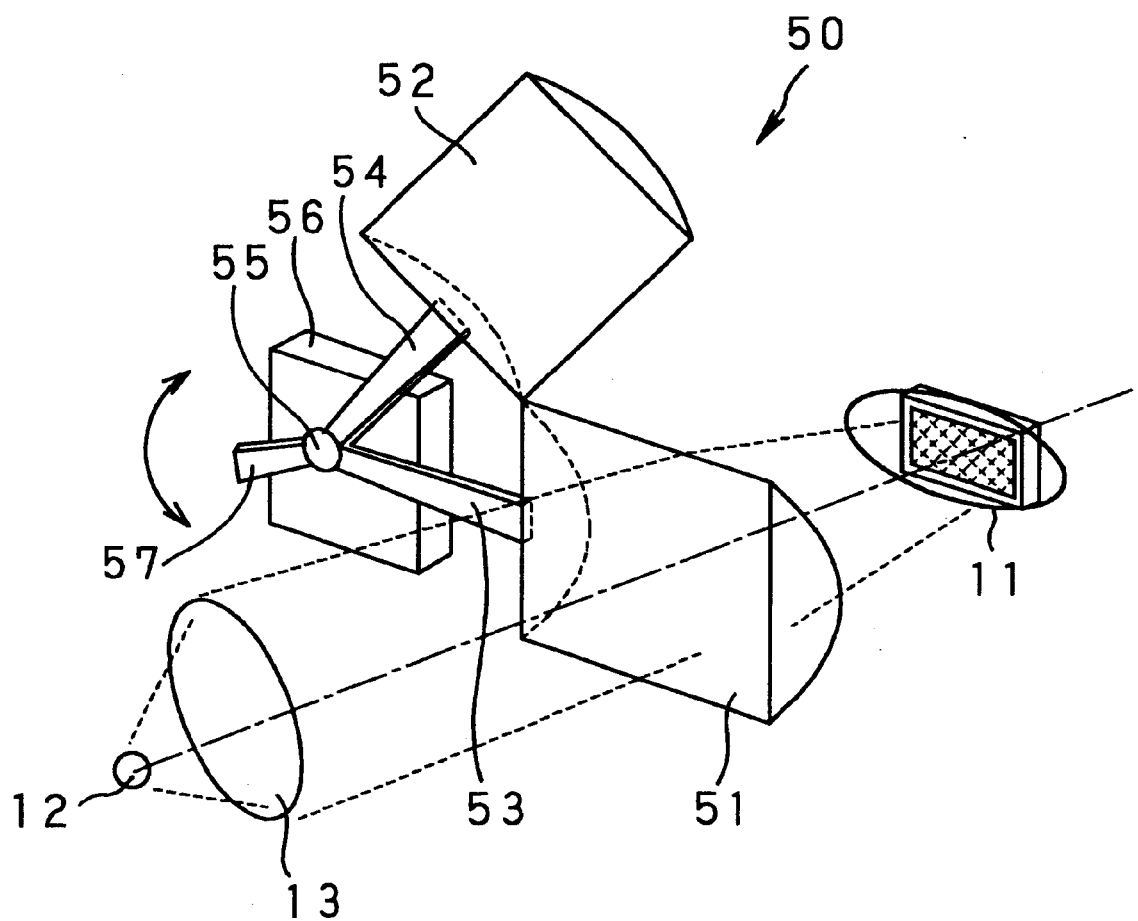
FIG. 11 is a perspective view showing the structure of a light beam shape conversion device in FIG. 10.

Referring to FIGS. 10 to 12, a picture display device of a third embodiment of the present invention is explained.

FIG. 10 schematically shows the structure of a picture display device of the third embodiment. This picture display device includes a red light-emitting diode 44R, a green light-emitting diode 44G and a blue light-emitting diode 44B each having a circular planar shape of the light radiating portion. The picture display device of the present embodiment also includes light beam shape changing devices 50R, 50G and 50B between the field lens 14R and the picture display light valve 11R, between the field lens 14G and the picture display light valve 11G and between the field lens 14B and the picture display light valve 11B, respectively.

FIG. 11 is a perspective view showing the structure of the light beam shape changing device 50 (generic appellation of 50R, 50G and 50B). This light beam shape changing device 50 includes two cylindrical lenses 51, 52. The radius of curvature of the curved surface of the cylindrical lens 52 is selected to be larger than that of the cylindrical lens 51. One end of the cylindrical lenses 51, 52 are connected to one ends of levers 53, 54, while the opposite end of the levers 53, 54 are connected to a common rotary shaft 55. A rotary shaft 55 is rotatably supported by a bearing 56 unit secured to a casing 16. To the rotary shaft 55 is connected a manual lever 57. The cylindrical lenses 51, 52 correspond to the optical devices of the present invention and are used to vary the cross-sectional shape of the light beam illuminated on the picture display light valve 11

It is also possible to provide a common lever for interlocking the manual levers 57 for the light beam shape changing devices 50R, 50G and 50B so that the common lever will be protruded outwardly of the casing 16, such that, by actuating this common lever, the manual levers 57 of the totality of the light beam shape changing devices 50R, 50G and 50B will be actuated simultaneously.

The light beam shape changing device 50 is designed so that, by rotating the manual levers 57, the levers 53, 54 will be rotated about the rotary shaft 55 as the center of rotation so that one of the cylindrical lenses 51, 52 will be selectively inserted into the illuminating light paths reaching the picture display light valve 11 from the light-emitting diode 12. If the cylindrical lens 51 is inserted into the illuminating light path, the cross-sectional shape of the light beam illuminated on the picture display light valve 11 is a transversely elongated elliptical shape. The cross-sectional shape of the light beam is set in the present embodiment so that, when the light beam is illuminated on the picture forming area having the aspect ratio of 9:16, the picture forming area in its entirety can be covered, while an area trespassing the picture forming area will be as small as possible. On the other hand, if the cylindrical lens 52 is inserted into the illuminating light path, the cross-sectional shape of the light beam illuminated on the picture display light valve 11 is a transversely elongated elliptical shape closer to a circular shape. The cross-sectional shape of the light beam is set in the present embodiment so that, when the light beam is illuminated on the picture forming area having the aspect ratio of 3:4, the picture forming area in its entirety can be covered, while an area trespassing the picture forming area will be as small as possible.

Figure 12A:
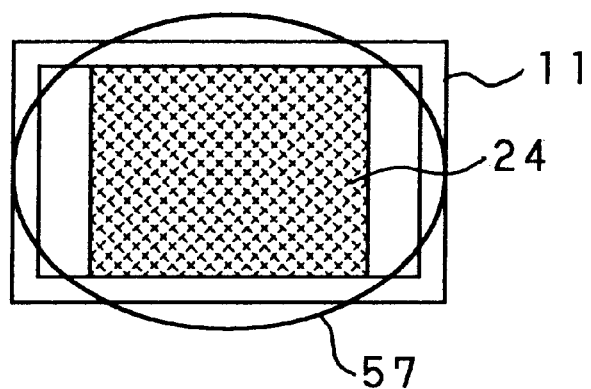
FIGS. 12A, 12B, 12C and 12D illustrate the relation between the shape of the picture forming area of the picture display light valve in the third embodiment and the light beam shape.
Figure 12B:
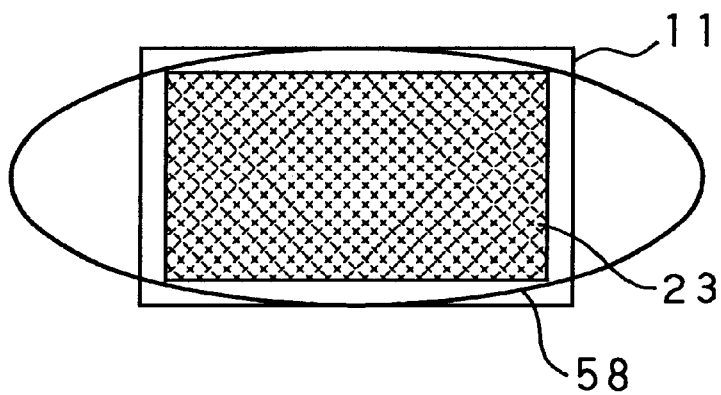
Figure 12C:
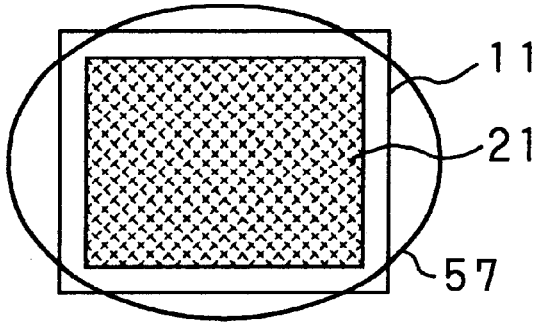
Figure 12D:
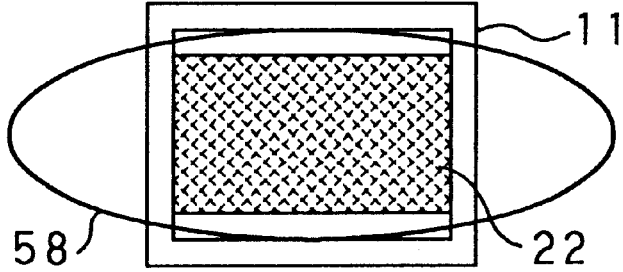

Thus, in the picture display device of the present embodiment, if, in the picture display device of the present embodiment, a picture with an aspect ratio of 3:4 as shown in FIG. 12A is to be formed, with the use of the picture display light valve 11 having the aspect ratio of 9:16, the cylindrical lens 52 is inserted into the illuminating light path to illuminate the light beam 57 of the transversely elongated elliptical shape closer to a circular shape on the picture forming area 24 of the picture display light valve 11. If a picture with an aspect ratio of 9:16 as shown in FIG. 12B is to be formed, the cylindrical lens 51 is inserted into the illuminating light path to illuminate the light beam 58 of the transversely elongated elliptical shape on the picture forming area 23 of the picture display light valve 11. If, with the use of the picture display light valve 11 having the aspect ratio of 3:4, a picture with an aspect ratio of 3:4 as shown in FIG. 12C is to be formed, the cylindrical lens 52 is inserted into the illuminating light path to illuminate the light beam 57 of the transversely elongated elliptical shape closer to a circular shape on the picture forming area 21 of the picture display light valve 11. If picture with an aspect ratio of 9:16 as shown in FIG. 12D is to be formed, the cylindrical lens 51 is inserted into the illuminating light path to illuminate the light beam 58 of the transversely elongated elliptical shape on the picture forming area 22 of the picture display light valve 11.

Since the cross-sectional shape of the light beam illuminated on the picture display light valve 11 can be changed by the light beam shape changing device 50, it becomes possible for the light source to cope with the plural shapes of the picture forming areas of the picture display light valve 11 without exchanging the light source. The structure and the operation of the present embodiment are otherwise the same as those of the first embodiment.

Figure 13:
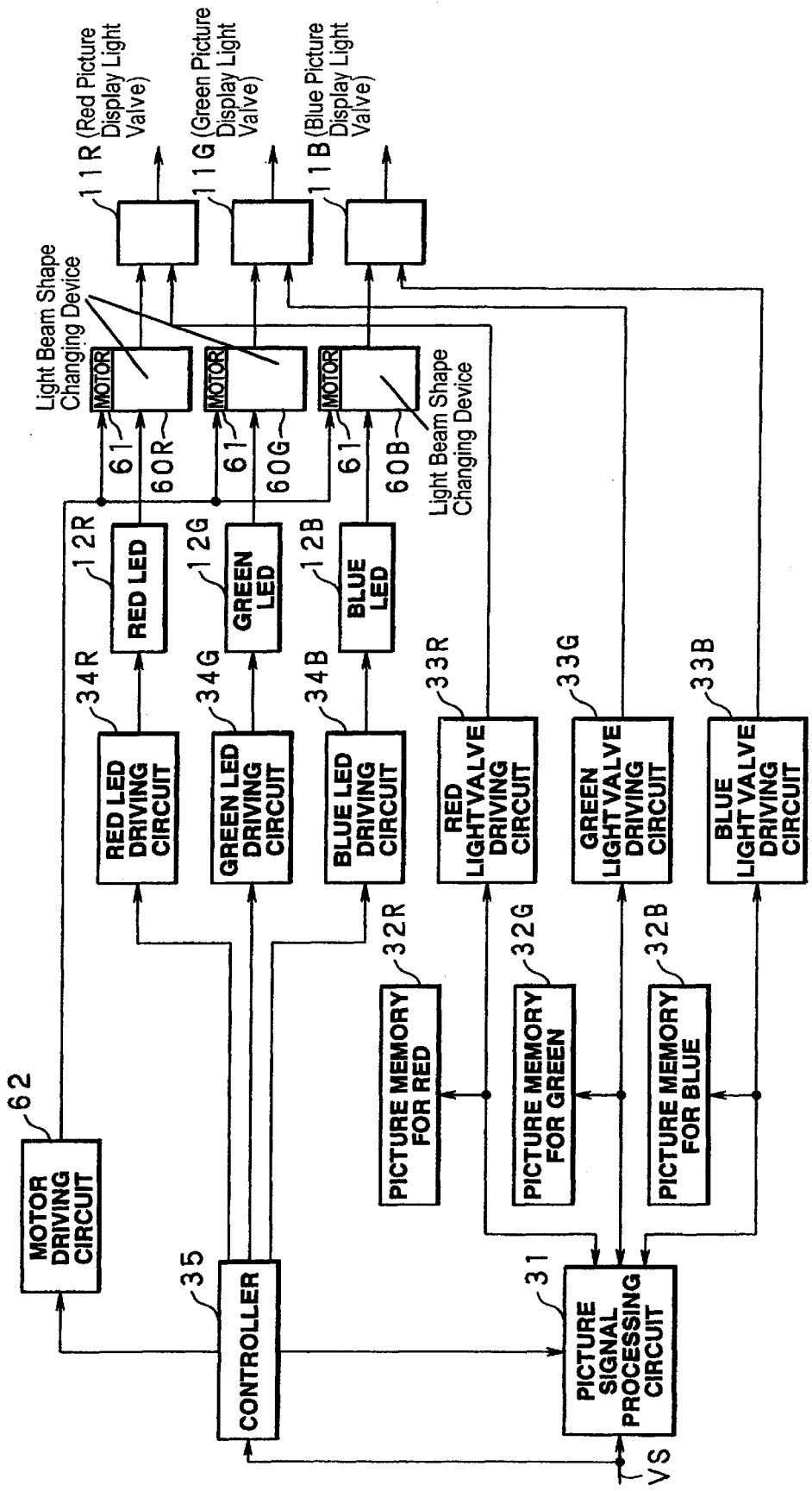
FIG. 13 is a block circuit diagram for illustrating the structure of a picture display apparatus according to a fourth embodiment of the present invention.
Figure 14:
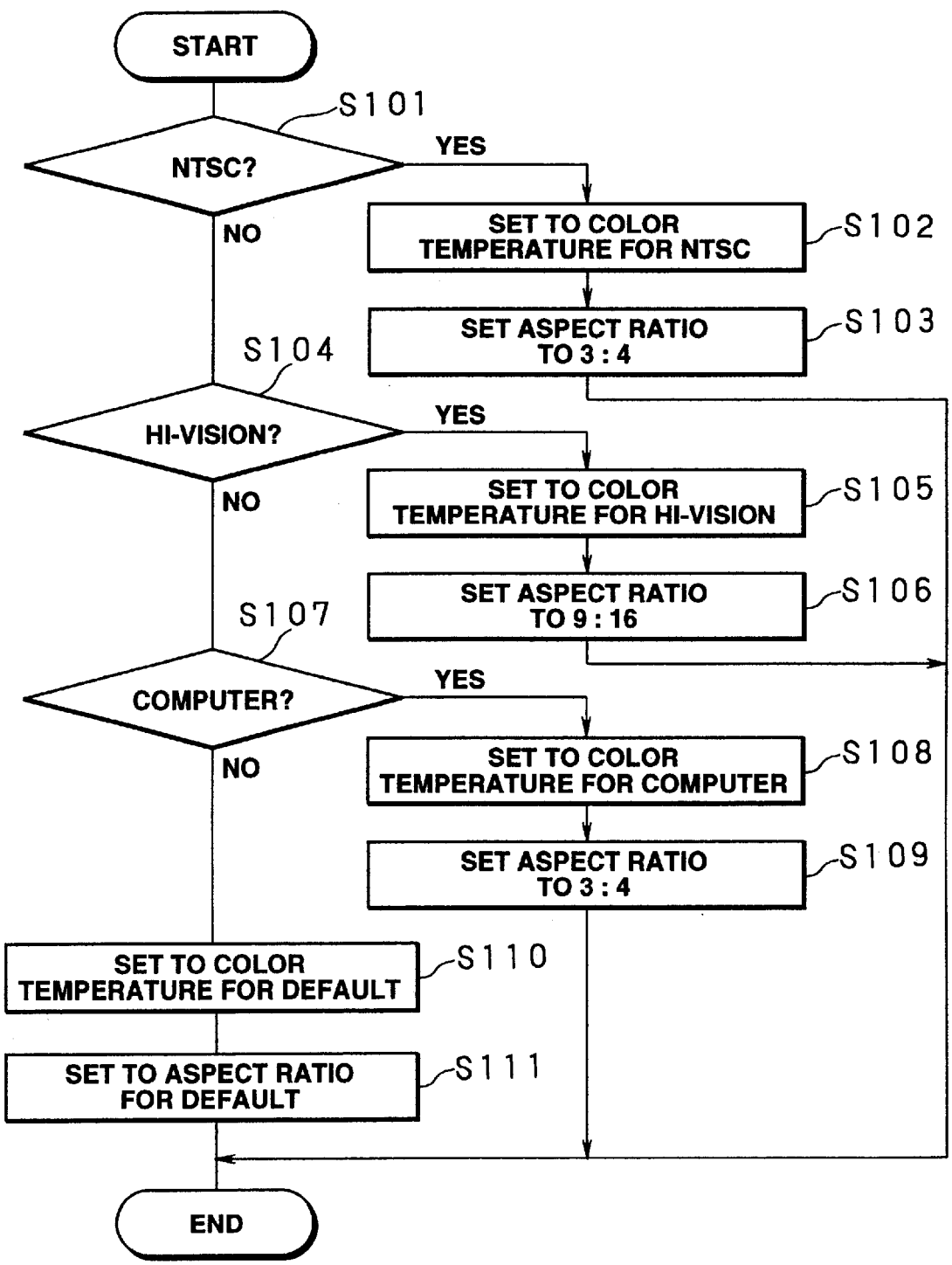
FIG. 14 is a flow diagram for illustrating the operation of the picture display apparatus according to the fourth embodiment of the present invention.

Referring to FIGS. 13 and 14, a picture display device according to a fourth embodiment of the present invention is explained.

With the present embodiment of the picture display device, switching between the cylindrical lenses 51, 52 in the light beam shape changing device is performed automatically in association with changes in the shape of the picture forming area in the picture display light valve 11, while the type of the displayed picture is discriminated and the light radiated by the light-emitting diodes of the respective colors is automatically adjusted in brightness in keeping with the color temperature of the white picture associated with the discriminated picture type.

Referring to the block diagram of FIG. 13, the picture display device of the present embodiment includes light beam shape changing devices 60R, 60G and 60B, in place of the light beam shape changing devices 50R, 50G and 50B of the third embodiment. These light beam shape changing devices 60R, 60G and 60B correspond to the light beam shape changing devices 50R, 50G and 50B except that the manual levers 57 are omitted and a motor 61 for rotating the rotary shaft 55 is provided in the bearing unit 56.

The picture display device of the present embodiment also includes a motor driving circuit 62 for driving the motor 61 for the light beam shape changing devices 60R, 60G and 60B. This motor driving circuit 62 is adapted to be controlled by a controller 35. Also, the light-emitting diode driving circuits 34R, 34G and 34B in the present embodiment are adapted for adjusting the brightness of the light radiated from the associated light-emitting diodes 12R, 12G and 12b under control by the controller 35. The controller 35 of the present embodiment is fed with the picture signals VS to control the light-emitting diode driving circuits 34R, 34G and 34B and the motor driving circuit 62 as will be explained subsequently.

FIG. 14 is a flow diagram showing the operation of the controller 35 concerning control of the light-emitting diode driving circuits 34R, 34G and 34B and the motor driving circuit 62 depending on the type of the picture signals. In this operation, the controller 35 first judges at step S101 whether or not the picture signals are of the NTSC system (step S101). If the system is the NTSC system (Y), the controller 35 controls the light-emitting diode driving circuits 34R, 34G and 34B so that the color temperature will be the color temperature of a white picture for the NTSC system (such as 9300°) to adjust the brightness of light radiated from the light-emitting diodes 12R, 12G and 12B (step S102). The controller 35 then controls the motor driving circuit 62 so as to meet the condition of the aspect ratio of 3:4 of the NTSC system to insert the cylindrical lens 52 into the illuminating light path of each color (step S103) to complete the operation of FIG. 14.

If the picture signals are not of the NTSC system (step S101; N), the controller 35 judges whether or not the picture signals are of the hi-vision system (step S104). If the system is the hi-vision system (Y), the controller 35 controls the light-emitting diode driving circuits 34R, 34G and 34B so that the color temperature will be the color temperature of a white picture for the hi-vision system (such as 6500°) to adjust the brightness of light radiated from the light-emitting diodes 12R, 12G and 12B (step S105). The controller 35 then controls the motor driving circuit 62 so as to meet the condition of the aspect ratio of 9:16 of the hi-vision system to insert the cylindrical lens 51 into the illuminating light path of each color (step S106) to complete the operation of FIG. 14

If the picture signals are not of the hi-vision system (step S104; N), the controller 35 judges whether or not the picture signals are those for a computer (step S107). If the picture signals are those for a computer (Y), the controller 35 controls the light-emitting diode driving circuits 34R, 34G and 34B so that the color temperature will be the color temperature of a white picture for the computer (such as 9300°) to adjust the brightness of light radiated from the light-emitting diodes 12R, 12G and 12B (step S108). The controller 35 then controls the motor driving circuit 62 so as to meet the condition of the aspect ratio of 3:4 of the picture for the computer to insert the cylindrical lens 52 into the illuminating light path of each color (step S109) to complete the operation of FIG. 14.

If the picture signals are not those for a computer (step S107; N), the controller 35 controls the light-emitting diode driving circuits 34R, 34G and 34B so that the color temperature will be the color temperature of a default white picture (such as 6500° or 9300°) to adjust the brightness of light radiated from the light-emitting diodes 12R, 12G and 12B (step S110). The controller 35 then controls the motor driving circuit 62 so as to meet the condition of the default aspect ratio of 3:4 or 9:16 to insert the cylindrical lens 52 or 51 into the illuminating light path of each color (step S111) to complete the operation of FIG. 14.

In judging whether or not the picture signals are of the NTSC system, hi-vision system or of the computer, horizontal or vertical synchronization signals in the picture signals can be detected to detect the frequency (Hz) of the horizontal or vertical synchronization frequency.

As the color temperature of the white picture for the NTSC system or the hi-vision system, that adopted by the Society of Electromechanical Association of Japan, for example, is used.

If additionally the television standards other than the NTSC system or the hi-vision system, such as PAL or SECAM, are to be met, it suffices to add steps similar to steps S101, S104 or S107.

With the picture display device of the present embodiment, since the switching of the cylindrical lenses 51, 52 and color temperature adjustment of the white picture are effected in dependence upon the discriminated type of the displayed picture, it is possible to set the optimum illuminating state and the optimum color temperature automatically. In addition, since the shape of the light beam illuminated on the picture forming area is varied automatically in dependence upon the shape of the picture forming area of the picture display light valve 11, it becomes possible to reduce the variation in brightness of the displayed picture.

In the present embodiment of the picture display device, it is also possible to provide an operation unit for entering user commands to the controller 35 for independently adjusting the brightness of the light radiated from the light-emitting diodes 12R, 12G and 12B and for switching the cross-sectional shape of the light beam on the picture display light valve 11 and in order for the controller 35 to adjust independently the brightness of the light radiated from the light-emitting diodes 12R, 12G and 12B or to switch the cross-sectional shape of the light beam on the picture display light valve 11 in accordance with the commands from the operating unit.

In the present embodiment of the picture display device, it is also possible for the controller 35 to adjust the brightness of the light radiated from the light-emitting diodes 12R, 12G and 12B, depending on the shape of the picture forming area in the picture display light valve 11 as detected based on the picture signals, for maintaining the brightness of the displayed picture in its entirety to a pre-set value.

With the picture display device of the present embodiment, it is also possible not to provide the light bundle shape changing devices 60R, 60G or 60R and to provide a light source device including plural light-emitting diodes of the second embodiment in place of the light-emitting diodes 12R, 12g or 12b, the controller 35 then controlling the light-emitting diode driving circuits 34R, 34G or 34B to switch the light-emitting diodes driven by the light source device 42 to switch the cross-sectional shape of the light beam on the picture display light valve 11.

The structure and the operation of the present embodiment are otherwise the same as those of the first to third embodiments.

Figure 15:
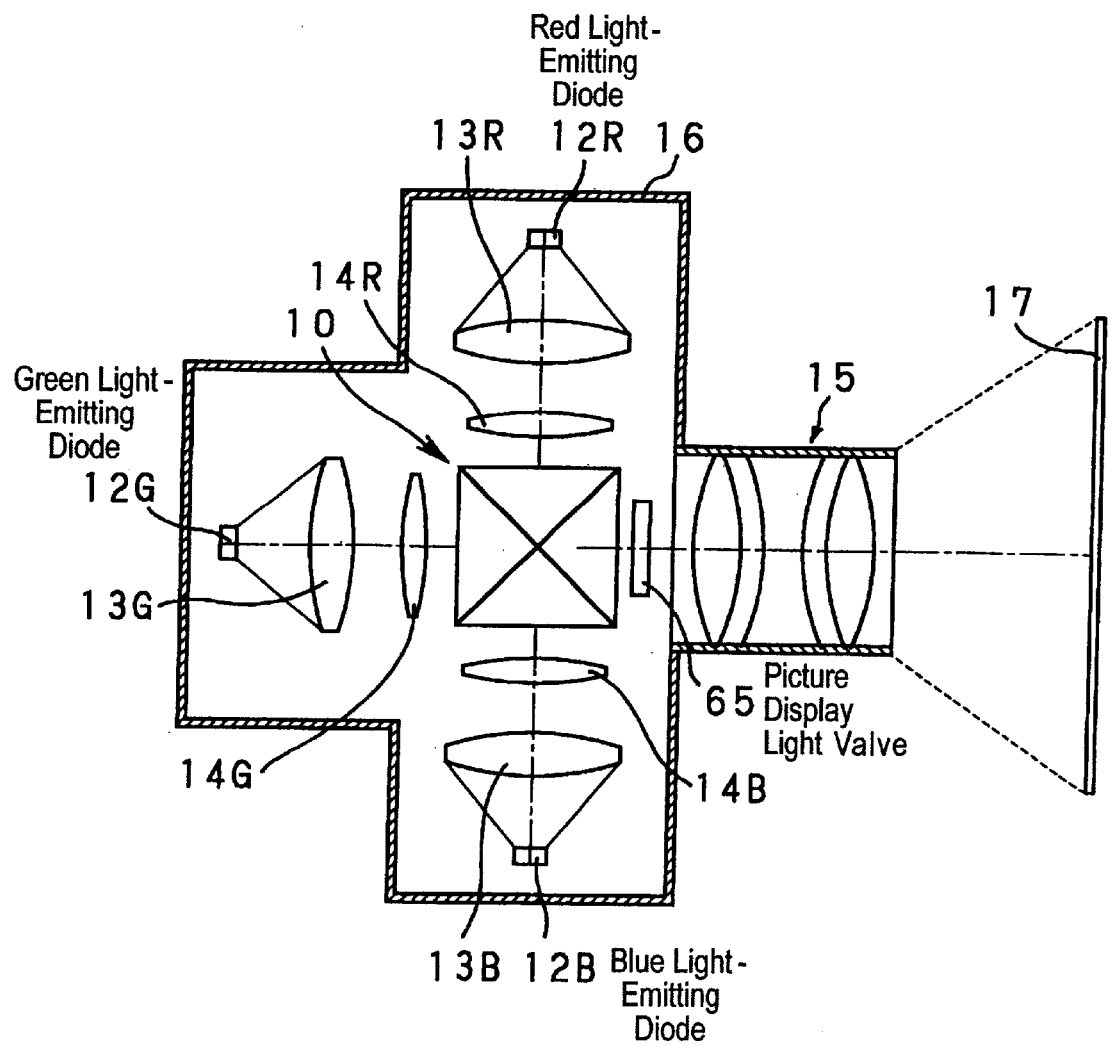
FIG. 15 is a schematic view for illustrating the structure of a picture display apparatus according to a fifth embodiment of the present invention.
Figure 16:
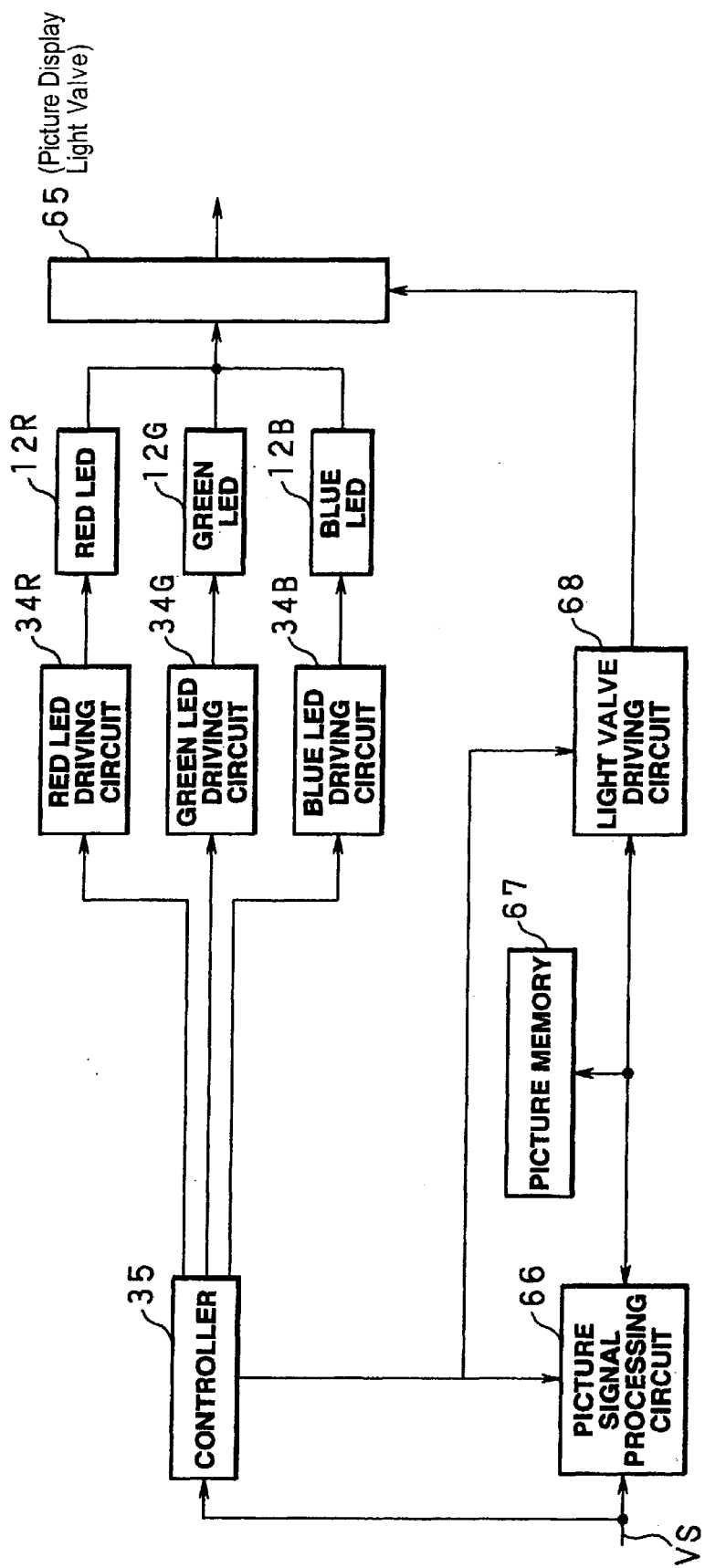
FIG. 16 is a block circuit diagram for illustrating the structure of the picture display apparatus according to the fifth embodiment of the present invention.
Figures 18A, 18B, 18C, 18D, 18E:
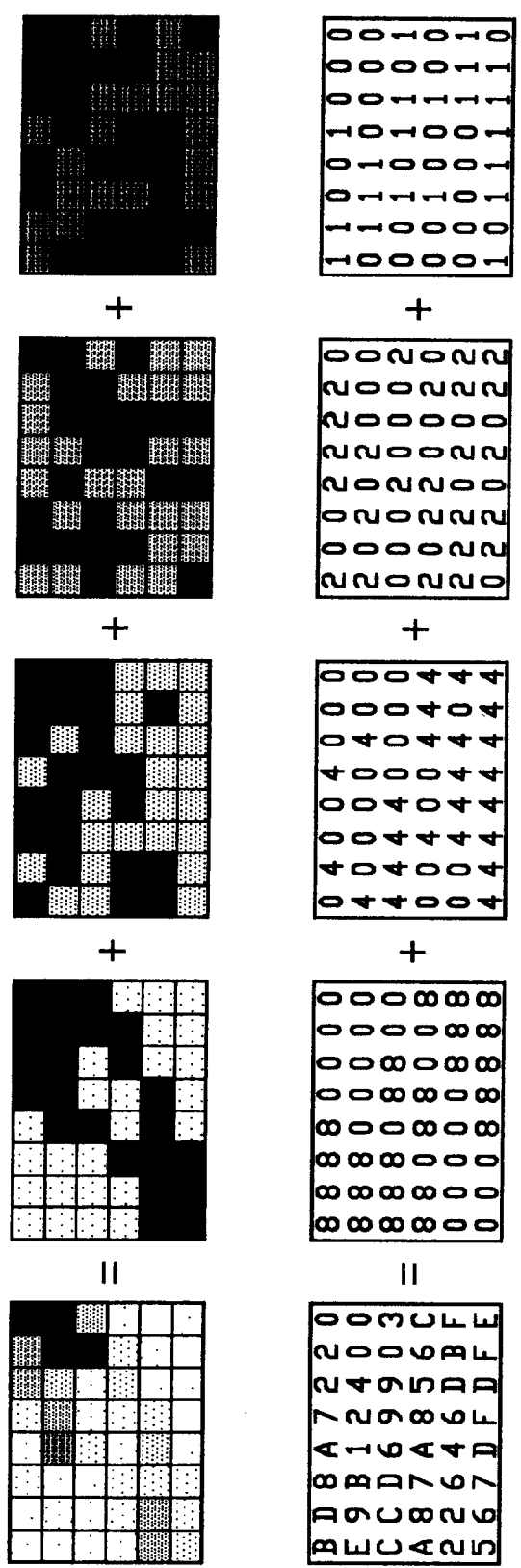
FIGS. 18A, 18B, 18C, 18D, 18E illustrate the principle of the digital gradation display system used in the picture display apparatus according to a sixth embodiment of the present invention.

Referring to FIGS. 15 to 17, a picture display device according to a fifth embodiment of the present invention is explained.

The picture display device of the present embodiment displays a color picture in accordance with the time-divisional color display system. FIG. 15 illustrates the structure of the present embodiment of the picture display device. The picture display device of the present embodiment is provided with a picture display light valve 65 between the synthesis prism 10 and the projection lens 15, instead of being provided with the picture display light valves 11R, 11G and 11B for respective colors of the first embodiment.

FIG. 16 is a block diagram showing a circuit structure of the present embodiment of the picture display device. The present embodiment of the picture display device includes a picture signal processing circuit 66 fed with the picture signals VS to generate red picture signals, green picture signals and blue picture signals associated respectively with red, green and blue pictures to sequentially switch and output the generated picture signals. The picture display device also includes a picture memory 67 for temporarily storing red picture signals, green picture signals and blue picture signals generated by the picture signal processing circuit 66 and a light valve driving circuit 68 connected to the picture signal processing circuit 66 and the picture memory 67 for driving the picture display light valve 65.

The picture display device also includes a red light-emitting diode driving circuit 34R, a green light-emitting diode driving circuit 34G and a blue light-emitting diode driving circuit 34B for driving the red light-emitting diode 12R, green light-emitting diode 12G and the blue light-emitting diode 12B and a controller 35 for controlling the picture signal processing circuit 66, light valve driving circuit 68 and the light-emitting diode driving circuits 34R, 34G and 34B. The light-emitting diode is indicated as LED in the drawings.

Referring to the timing chart of FIGS. 17A–17D, the operation of the picture display device of the present embodiment is explained. The controller 35, fed with the picture signals VS, generates timing signals for splitting a frame period or a field period into three equal portions in timed relation to the picture signals and sends the generated timing signals to the picture signal processing circuit 66 and to the light valve driving circuit 68. The picture signal processing circuit 66 is responsive to these timing signals to generate red picture signals, green picture signals and the blue picture signals, and sequentially switches between these signals to output the selected signals. These picture signals are temporarily stored in the picture memory 67. The light valve driving circuit 68 is responsive to the timing signals from the controller 35 to sequentially read out the picture signals of the respective colors from the picture memory 67 to drive the picture display light valve 65. The result is that, in the picture display light valve 65, gradation pictures of red (R), green (G) and blue (B) are sequentially switched and displayed during a frame or field period, as shown in FIG. 17D.

The controller 35 controls the light-emitting diode driving circuits 34R, 34G and 34B, in a time relation to the display of the gradation pictures for red, green and blue colors in the picture display light valve 65, so that the light-emitting diodes 12R, 12G and 12B will be turned on sequentially. The result is that the light-emitting diodes 12R, 12G and 12B (indicated as LED R, LED G and LED B in FIGS. 17A–17C) are turned on in a timed relation with the display of the gradation pictures for red, green and blue in the picture display light valve 65, so that the light beams of the respective colors are sequentially switched and illuminated on the picture display light valve 65.

By the above operation, the red, green and blue pictures are sequentially switched and projected on the screen 17. These pictures are perceived by the viewer as the color picture due to the after-image effect of the human eye. The present embodiment is otherwise the same in structure and operation as the first embodiment.

Referring to FIGS. 18A–18E and 19A–19D, a picture display device of a sixth embodiment of the present invention is explained. The picture display device of the sixth embodiment displays a color picture in accordance with the time-divisional display system and a digital gradation display system, as in the fifth embodiment.

Referring first to FIGS. 18B to 18E, the principle of the digital gradation display system is explained. The principle of the digital gradation display system resides in representing a picture, desired to be displayed, as shown in FIG. 18A, as a sum of plural bit pictures (bi-level pictures) weighted as shown in FIGS. 18B to 18E. An upper portion of FIG. 18A denotes an example of the gradation picture to be displayed, while upper portions of FIG. 18B to 18E denote bit pictures weighted to 8:4:2:1, while lower portions of FIGS. 18B to 18E denote the brightness of the pixels in the pictures of the upper portions in hexadecimal notation. With the present digital gradation display system, weighted bit picture groups are displayed in one frame period, by controlling the light source and the picture display light valve for bi-level display. Thus, the user can feel the gradation in the displayed picture by the after-image effect proper the human visual system.

There are mainly two methods for weighting the bit picture in the digital gradation display. One is the pulse width modulation gradation display in which the brightness of the illuminating light is rendered constant and weighting is by the length of the display time of each bit picture. The other is the light intensity modulation gradation display in which the display time of each bit picture is rendered constant and weighting is by the brightness of the illuminating light. These two methods may be used in combination.

The structure of the picture display device of the present embodiment is substantially the same as that shown in FIG. 16.

Referring to the timing chart of FIG. 18, the operation of the picture display device of the present embodiment is explained. FIGS. 19A to 19C show the light emission timing and volume of the light-emitting diodes 12R, 12G and 12B, respectively. FIG. 19D shows the display state of the picture display light valve 65. In the following description, it is assumed that digital gradation representation is carried out by employing the pulse width modulation gradation representation and light intensity modulation gradation representation in combination. Also, in the following description, it is assumed that bit pictures weighted to 8:4:2:1 for representing the red gradation picture are indicated as R8, R4, R2 and R1, bit pictures weighted to 8:4:2:1 for representing the green gradation picture are indicated as G8, G4, G2 and G1 and bit pictures weighted to 8:4:2:1 for representing the blue gradation picture are indicated as B8, B4, B2 and B1.

The controller 35, fed with the picture signals VS, generates pre-set timing signals synchronized with the picture signals VS and routes the generated signals to the picture signal processing circuit 66 and to the light valve driving circuit 68. The picture signal processing circuit 66 is responsive to these timing signals to generate picture signals of the bit pictures R8, G8, B8, R4, G2, B1, R4, G2, B1, R4, G2, B1 to switch sequentially and output these picture signals. These picture signals are temporarily stored in the picture memory 67. The light valve driving circuit 68 is responsive to the timing signals from the controller 35 to read out the picture signals sequentially from the picture memory 67 to drive the picture display light valve 65 based on these picture signals. In the present embodiment, a ⅔-period of a frame beginning from the leading end of the frame is split into three equal portions for sequentially displaying bit pictures R8, G8, B8, while the remaining period of the frame is divided into three equal portions for sequentially displaying bit pictures R4, G2, B1, R4, G2, B1, R4, G2, B1 as shown in FIG. 19D. Therefore, the period of displaying the bit pictures R8, G8, B8 is twice as long as the period of displaying the remaining bit pictures.

The controller 35 controls the light-emitting diode driving circuits 34R, 34G and 34B, in a time relation to the display of the gradation pictures for red, green and blue in the picture display light valve 65, so that the light-emitting diodes 12R, 12G and 12B will be turned on sequentially, as shown in FIGS. 19A to 19C. The controller 35 also controls the light-emitting diode driving circuits 34R, 34G and 34B so that, during the period the bit pictures 34R, 34G and 34B are displayed and during the period the bit pictures 34R, 34G and 34B are displayed, the light emission volumes of the light-emitting diodes 12R, 12G and 12B are equal to one another, and so that, if the light emission volume is 1, the light emission volume during the period the bit pictures R2, G2 and B2 are displayed is ½ and the light emission volume is 1, the light emission volume during the period the bit pictures R1, G1 and B1 are displayed is ¼. By the above operation, the light beams of the plural bit pictures, weighted by 8:4:2:1 from color to color in each frame, are sequentially projected on the screen 17. These pictures are perceived by the viewer as the color picture due to the afterimage effect of the human eye. The present embodiment is otherwise the same in structure and operation as the fifth embodiment.

Figure 20:
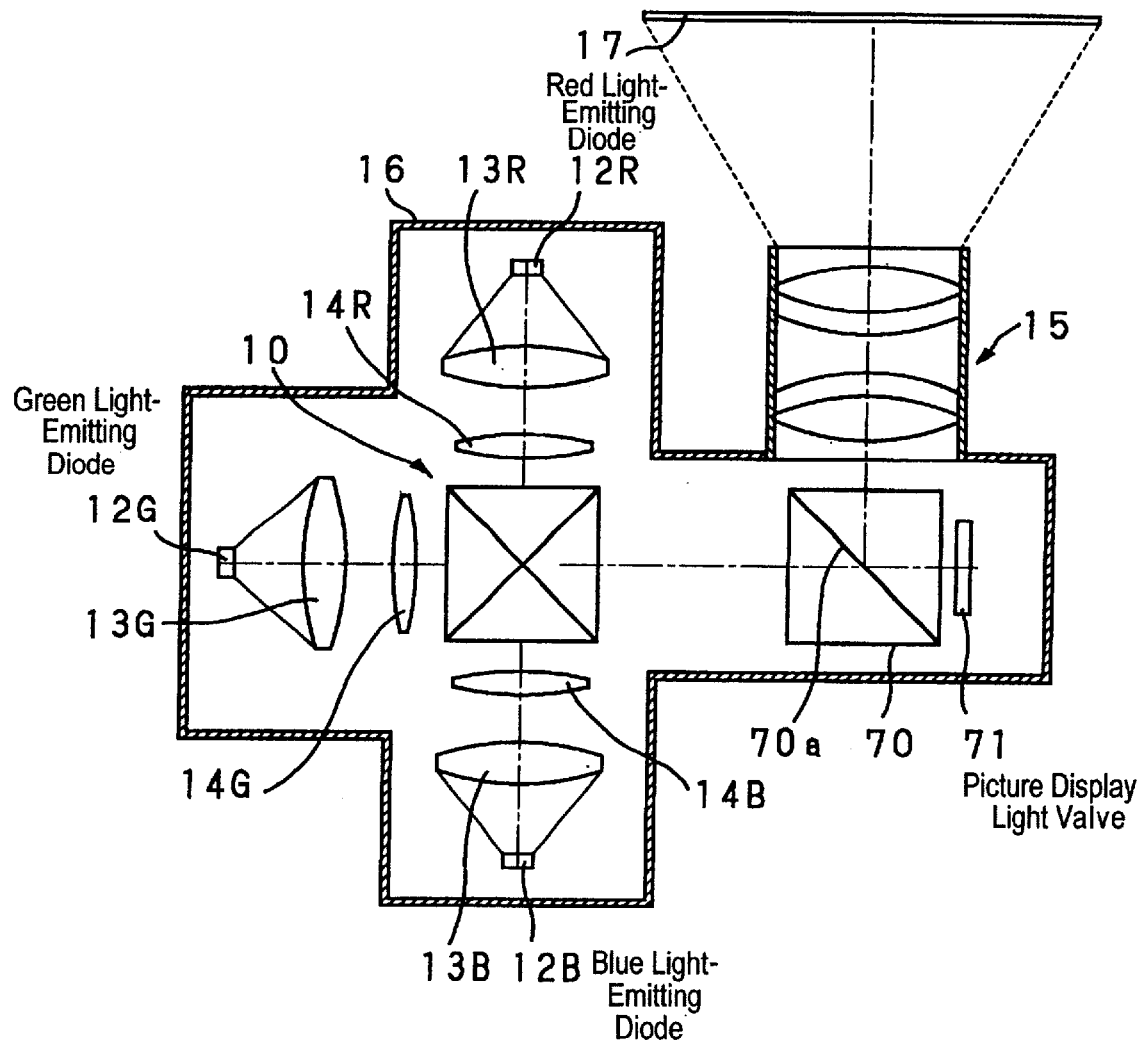
FIG. 20 is a schematic view for illustrating the structure of a picture display apparatus according to a seventh embodiment of the present invention.

FIG. 20 shows a schematic view for illustrating the structure of a picture display device according to a seventh embodiment of the present invention. The present embodiment of the picture display device uses a reflection type liquid crystal light valve as the picture display light valve to display a color picture using the time-divisional color display system. Of course, a transmission type liquid crystal light valve as shown in FIG. 15 may be used for the time-divisional color display system.

The present embodiment of the picture display device includes a polarisation beam splitter 70 and a picture display light valve 71 employing a reflection type liquid crystal light valve in the fifth embodiment of the picture display device of FIG. 15, in place of the picture display light valve 65 employing the transmission type liquid crystal light valve. The polarisation beam splitter 70 and the picture display light valve 71 are arrayed in this order on the optical path of the outgoing light of the synthesis prism 10. The polarisation beam splitter 70 has a reflecting surface 70a transmitting the P-polarized light (polarized light having the direction of light polarization parallel to the incident surface) and reflecting the S-polarized light (polarized light having the direction of light polarization normal to the incident surface). In the present embodiment, the projection lens 15 is arranged in a direction in which the light from the picture display light valve 71 proceeds after reflection on the reflecting surface 70a of the polarisation beam splitter 70.

Similarly to the fifth embodiment, the picture display device of the present embodiment drives the light-emitting diodes 12R, 12G and 12B and the picture display light valve 71 in accordance with the time-divisional color display system. The light beams outgoing from the light-emitting diodes 12R, 12G and 12B fall on the polarisation beam splitter 70 via relay lenses 13R, 13G and 13B and field lenses 14R, 14G and 14B. Of the light incident on the polarisation beam splitter 70, only the P-polarized components are transmitted through the reflective surface 70a to fall on the picture display light valve 71. The picture display light valve 71, employing the reflective liquid crystal light valve, converts the polarized state (polarization degree) on the pixel basis responsive to the displayed picture by exploiting double reflection by way of spatially modulating the incident light for reflection towards the polarisation beam splitter 70. The polarisation beam splitter 70 reflects only the S-polarized component of the light from the picture display light valve 71 on its reflective surface 70a to cause the reflected light to fall on the projection lens 15 for projection on the transmission or reflection type screen 17 to an enlarged scale. The present embodiment is otherwise the same in structure and operation as the fifth embodiment.

Figure 21:
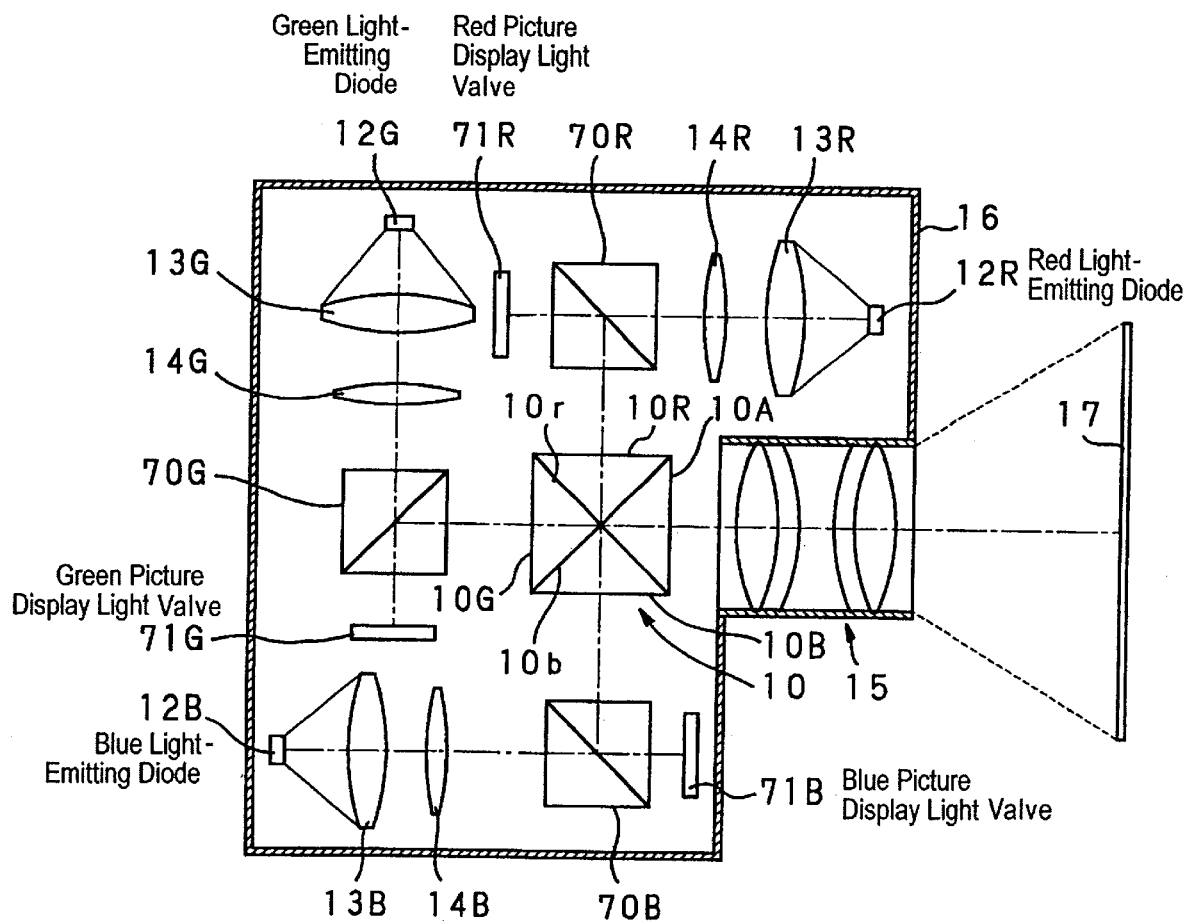
FIG. 21 is a schematic view for illustrating the structure of a picture display apparatus according to an eighth embodiment of the present invention.

FIG. 21 is shows schematic view for illustrating the structure of a picture display device according to an eighth embodiment of the present invention. The picture display device of the present embodiment includes, for each color, a picture display light valve employing a reflection type liquid crystal light valve. The present picture display device includes a red light-emitting diode 12R, a red relay lens 13R, a red field lens 14R, a red polarisation beam splitter 70R and a red picture display light valve 71R, which are linearly arranged so that, of the light reflected by the red picture display light valve 71R, the S-polarized light component reflected by the red polarisation beam splitter 70R will be incident on the surface 10R of the synthesis prism 10. The picture display device also includes a green light-emitting diode 12G, a green relay lens 13G, a green field lens 14G, a green polarisation beam splitter 70G and a green picture display light valve 71G, which are linearly arranged so that, of the light reflected by the red picture display light valve 71 G, the S-polarized light component reflected by the green polarisation beam splitter 70R will be incident on the surface 10G of the synthesis prism 10. The picture display device also includes a blue light-emitting diode 12B, a blue relay lens 13B, a blue field lens 14B, a blue polarisation beam splitter 70B and a blue picture display light valve 71B, which are linearly arranged so that, of the light reflected by the red picture display light valve 71B, the Spolarized light component reflected by the green polarisation beam splitter 70B will be incident on the surface 10B of the synthesis prism 10.

The principle of modulation by the polarisation beam splitters 70R, 70G and 70B and the picture display light valves 71R, 71G and 70B is similar to that explained in connection with the seventh embodiment. The light beams, modulated from color to color, are synthesized by the synthesis prism 10 to be projected by the projection lens 15 on the screen 17. The present embodiment is otherwise the same in structure and operation as the fifth embodiment.

Figure 22:
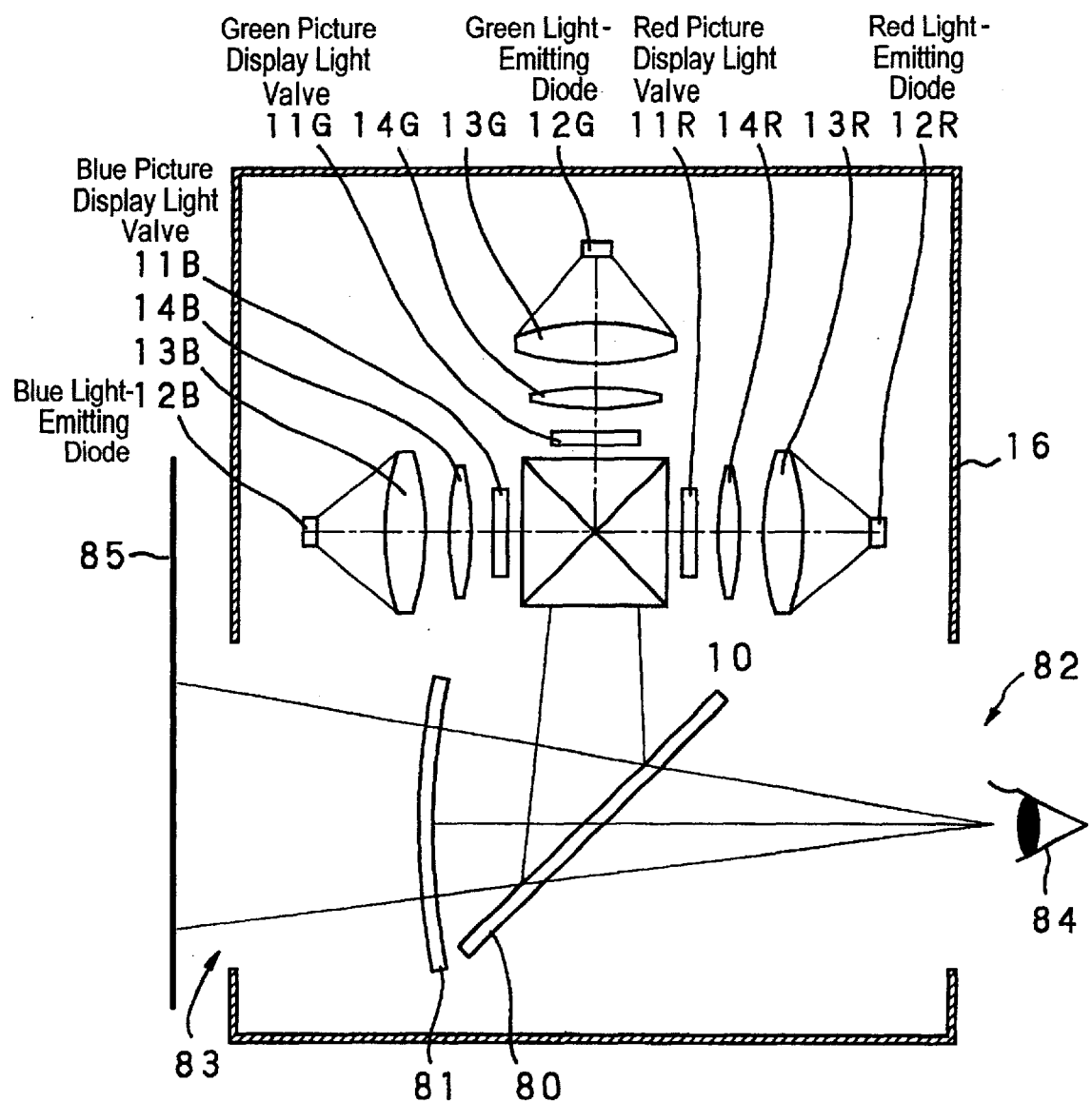
FIG. 22 is a schematic view for illustrating the structure of a picture display apparatus according to a ninth embodiment of the present invention.

FIG. 22 is shows schematic view for illustrating the structure of a picture display device according to a ninth embodiment of the present invention. The present embodiment of the picture display device is of the virtual image display type and takes the form of a head mounting display attached to the user's head. Of course, the picture display device of the present embodiment can be designed as the virtual image display type not attached to the user's head.

The picture display device includes a synthesis prism 10, picture display light valves 11R, 11G and 11B, light-emitting diodes 12R, 12G and 12B, relay lenses 13R, 13G and 13*b* and field lenses 14R, 14G and 14*b*, arranged in the relative disposition similar to that of the first embodiment. The picture display device of the present embodiment also includes a half mirror 80 arranged on the optical path of the outgoing light beam from the synthesis prism 10, and a concave mirror 81 arranged on the optical path of the light radiated from the synthesis prism 10 and reflected by the half mirror 80. The concave mirror 81 is also used as a half mirror. These components are held by a suitable holder and arranged in a casing 16.

With the present embodiment of the picture display device, the light beams modulated from color to color as in the first embodiment are synthesized by the synthesis prism 10 and partially reflected by the half mirror 80 to fall on the concave mirror 81 where the light is partially reflected to fall on the half mirror 80 and is partially transmitted to be projected on an eye 84 of the viewer via aperture 82. Thus, an enlarged virtual image 85, corresponding to the picture synthesized by the synthesis prism 10, can be seen by the viewer along with the forward background. The present embodiment is otherwise the same in structure and operation as the first embodiment.

Figure 23:
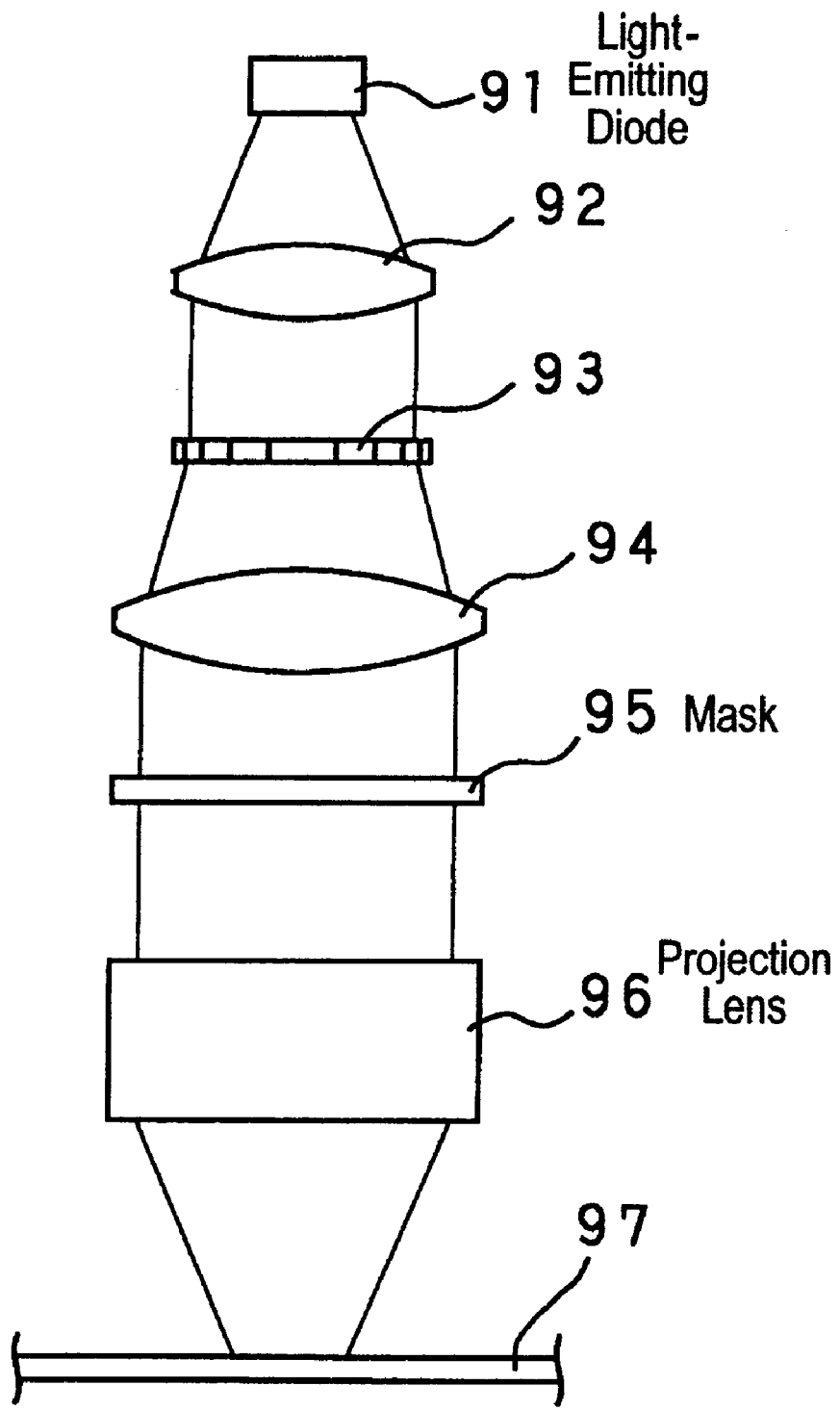
FIG. 23 is a schematic view for illustrating the structure of a picture display apparatus according to a tenth embodiment of the present invention.

FIG. 23 shows a schematic view for illustrating the structure of a picture display device according to a tenth embodiment of the present invention. In the present embodiment, the invention is applied to a light exposure device in which a mask pattern (corresponding to the picture in the present invention) is projected for light exposure on a photoresist placed on a semiconductor wafer. The present embodiment of the light exposure device includes a light-emitting diode 91 for radiating the light sensitive to a photoresist(visible light or ultraviolet light), a collector lens 92 for collecting the outgoing light of the light-emitting diode 91, and a fly-eye lens 93 for homogenizing the intensity of illumination of the light after passing through the fly-eye lens 93. The light exposure device also includes a condenser lens 94 for condensing the light passed through the fly-eye lens 92 for illumination on a mask 95 having a pre-set pattern formed thereon (corresponding to the spatial modulation means of the present invention) and a projection lens 96 for projecting the light passed through the mask 95 on the photoresist on the semiconductor wafer 97. In the present embodiment, the light radiating portion of the light-emitting diode 91 is shaped equivalently to the picture forming area of the mask 95 so that the light beam illuminated on the picture forming area of the mask 95 will be shaped equivalently to the picture forming area. In the present embodiment the outgoing light of the light-emitting diode 91 can be adjusted in brightness, as in the first embodiment.

In the present light exposure device, the light radiated by the light-emitting diode 91 is illuminated on the mask 95 via the collector lens 92, fly-eye lens 93 and the condenser lens 94. The light spatially modulated by the mask 95 is projected by the projection lens 96 on the photoresist of the semiconductor wafer 97 for exposing the photoresist to light. The light exposure device of the present embodiment may be an equal-size light exposure device or a step type device for contraction projection light exposure.

With the present embodiment of the light exposure device, in which a light-emitting diode 91 is used as a light source, the light source may be prolonged in service life and the power consumption may be reduced, while the light exposure device may be reduced in size. Moreover, with the present embodiment of the light exposure device, the light radiating portion of the light-emitting diode 91 is shaped in keeping with the profile of the picture forming area of the mask 95 so that the light beam illuminated on the picture forming area of the mask 95 is shaped equivalently to the picture forming area, thus improving the light utilization efficiency. Moreover, the power consumption is further reduced to render the device more compact. In addition, with the present embodiment of the light exposure device, since the outgoing light of the light-emitting diode 91 can be adjusted in brightness, the light exposure volume can be adjusted easily.

The present invention is not limited to the above-described illustrative embodiments. For example, not only the synthesis prism 10 but also the dichroic mirror or a color filter transmitting or reflecting particular wavelength components may be used for synthesizing pictures of respective colors.

As spatial modulation means, a liquid crystal light valve employing a dielectric liquid crystal or a high-molecular dispersion liquid crystal may be used in addition to those given in the embodiments. Moreover, the spatial modulation means for controlling the light reflection, transmission or diffraction on the pixel basis by mechanical means for spatial light modulation may also be used.

In the present embodiment, a light-emitting diode emitting red, green or blue light is used. In this case. The picture display light valve is designed to be driven based in color signals corresponding to the color of the radiated light of the light-emitting diode.

Although the two cylindrical lenses are switched in the third and fourth embodiments for switching the cross-sectional profile of the light beam, one or not less than three cylindrical lenses may be used to vary the cross-sectional area of the light beam. If a sole cylindrical lens is used, the cross-sectional profile of the light beam is switched depending on whether the cylindrical lens is to be inserted into the optical path. The optical component used for varying the cross-sectional profile of the light beam may also be a mirror having a cylindrical surface, prism or other element, without being limited to a cylindrical lens. The cross-sectional profile of the light beam may also be varied continuously by arranging the cylindrical lens and the lens having a cylindrical recessed surface in a direction along the proceeding direction of the illuminating light beam and/or the lenses may be varied in the mounting positions for continuously varying the cross-sectional profile of the light beam.

The light-emitting diode having a rectangular light radiating portion (light emitting surface) as that used in the first embodiment may be used, and the profile of the light beam radiated from the light-emitting diode may be varied using an optical element such as a cylindrical lens, as in the first embodiment, for selectively generating plural sorts of the light beams having different values of the aspect ratio.

The respective embodiments may be suitably combined to constitute a picture display device.

In the above-described fifth and sixth embodiments, the color picture is displayed in accordance with the time-divisional color display system. In the time-divisional color display system, different colors are displayed time-divisionally for color synthesis for displaying a color picture. That is, a frame which is the display time for a picture is divided into three portions and pictures of respective colors of red, green and blue are sequentially outputted to the picture display light valves, at the same time as the light beams of corresponding colors are sequentially illuminated on the picture display light valves to display a color picture.

However, if the pictures of the red, green and blue colors are time-divisionally displayed to effect color synthesis to display a color picture, the light emitting time of each color is one-third the frame period. In addition, the pictures of respective colors are repeatedly turned on and off. Thus, there are occasions wherein, during eye blinking time or when the eye follows a moving object, color synthesis cannot be achieved.

Figure 24:
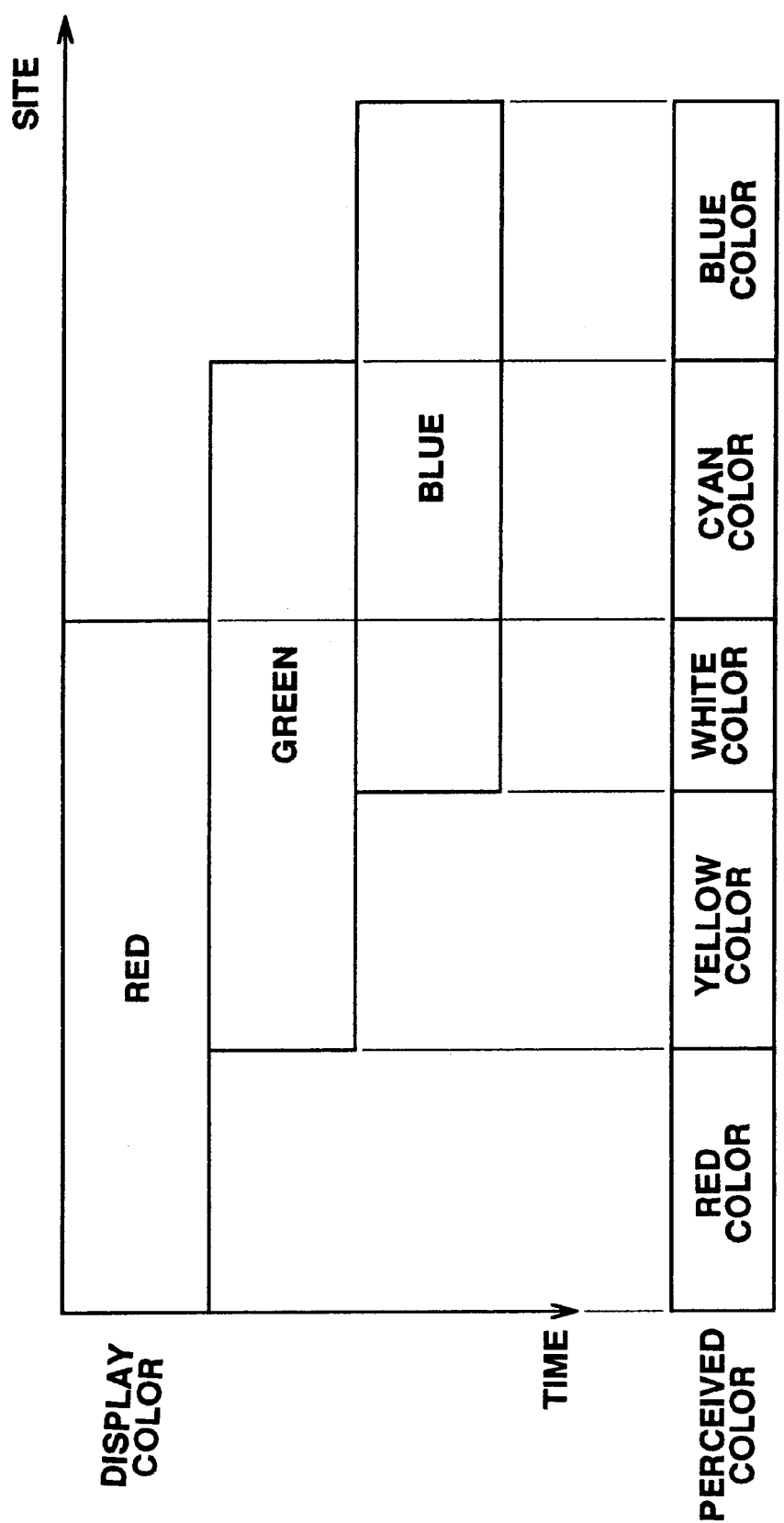
FIG. 24 illustrates an edge chromatic phenomenon.

That is, during eye blinking time, so-called color splitting is likely to be produced. Otherwise, if an eye follows a moving object, a so-called edge chromatic phenomenon is likely to be incurred, as shown in FIG. 24. FIG. 24 shows the state in which color synthesis of red, green and blue colors leads to red or yellow portions and blue or cyan portions, instead of to a white color portion, at an end or at the opposite end by the edge chromatic phenomenon.

Figure 25:
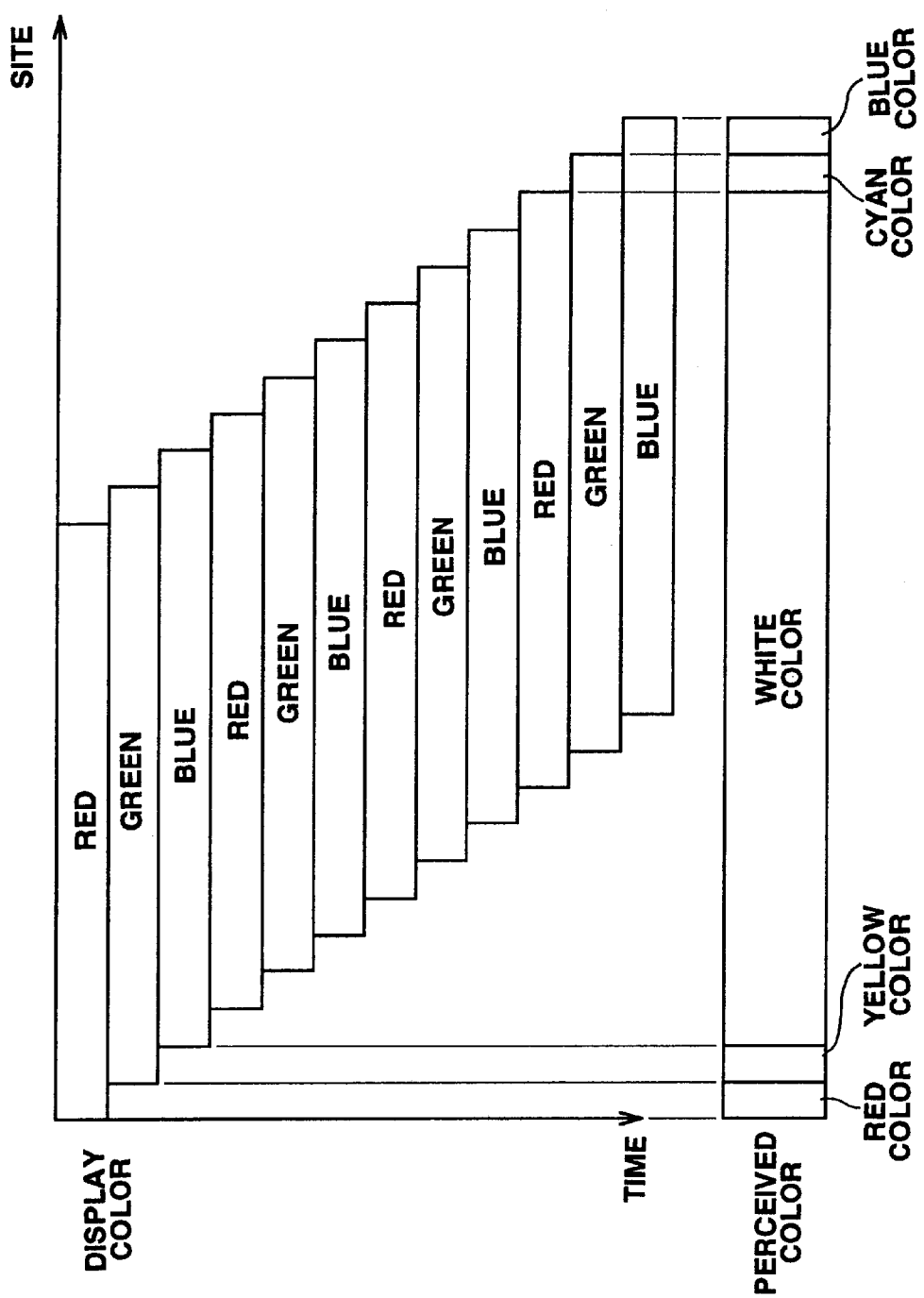
FIG. 25 is a diagrammatic view for illustrating how the occurrence of the edge chromatic phenomenon can be suppressed by shortening the time of continuous display of a monochromatic picture.

The color splitting or the edge chromatic phenomenon can be suppressed by shortening the continuous display time of a monochromatic picture. It can be clarified by the comparison between FIG. 24 and FIG. 25.

An illustrative method to suppress the color-splitting or the edge chromatic phenomenon is explained by referring to FIG. 26 and to a timing chart shown in FIG. 33.

In FIGS. 26 to 33, similarly to FIG. 19, A to C denote the light emission timing and volume of the light-emitting diodes 12R, 12G and 12B, respectively, while D denotes the display state of the picture display light valve 65. As in FIG. 19, bit pictures weighted to 8:4:2:1 for representing the red gradation picture are indicated as R8, R4, R2 and R1, bit pictures weighted to 8:4:2:1 for representing the green gradation picture are indicated as G8, G4, G2 and G1 and bit pictures weighted to 8:4:2:1 for representing the blue gradation picture are indicated as B8, B4, B2 and B1.

Also, in the following description, the combination of the red gradation picture, having the weighting equal to 1, green gradation picture, having the weighting equal to 1 and the blue gradation picture, having the weighting equal to 1, is termed a bit plane BP1 having the weighting equal to 1. Similarly, the combination of the red gradation picture, having the weighting equal to 2, green gradation picture, having the weighting equal to 2 and the blue gradation picture, having the weighting equal to 2, is termed a bit plane BP2 having the weighting equal to 2. Likewise, the combination of the red gradation picture, having the weighting equal to 4, green gradation picture, having the weighting equal to 4 and the blue gradation picture, having the weighting equal to 4, is termed a bit plane BP3 having the weighting equal to 4, while the combination of the red gradation picture, having the weighting equal to 8, green gradation picture, having the weighting equal to 8 and the blue gradation picture, having the weighting equal to 8, is termed a bit plane BP4 having the weighting equal to 8.

First, an example of FIG. 26 is explained. In the example of FIG. 26, pulse width modulation gradation representation is used for digital gradation representation. The bit plane BP1, having the weighting equal to 1, bit plane BP2, having the weighting equal to 2, bit plane BP3, having the weighting equal to 4 and the bit plane BP4 having the weighting equal to 8 are displayed in this order.

That is, in the example of FIG. 26, pictures R1, G1 and B1, each having a pulse width equal to τ, are displayed in this order as the bit plane BP1 having the weighting equal to 1. Then, pictures R2, G2 and B2, each having a pulse width equal to 2τ, are displayed in this order as the bit plane BP2 having the weighting equal to 2.

Next, pictures R4, G4 and B4, each having a pulse width equal to 4τ, are displayed in this order as the bit plane BP3 having the weighting equal to 4. Finally, pictures R8, G8 and B8, each having a pulse width equal to 8τ, are displayed in this order as the bit plane BP4 having the weighting equal to 8.

If this display is done by the picture display device shown in FIG. 16, the controller 3 5 generates pre-set timing signals synchronized with the input picture signals VS, and sends the timing signals to the picture signal processing circuit 66 and to the light valve driving circuit 68. The picture signal processing circuit 66 is responsive to these timing signals to generate picture signals of bit pictures R1, G1, B1, R2, G2, B2, R4, G4, B4, R8, G8 and B8 each frame and sequentially switches and outputs the picture signals. These picture signals are transiently stored on the picture memory 67. The light valve driving circuit 68 is responsive to the timing signals from the controller 35 to read out sequentially the picture signals of the bit pictures from the picture memory 67 to drive the 65 based on these picture signals.

At this time, the bit pictures B1, R2, G2, B2, R4, G4, B4, R8, G8 and B8 are sequentially displayed beginning from the leading end of each frame, as shown in FIG. 26D. Since the pulse width modulation gradation representation is used in the present example, the period during which the bit pictures R2, G2 and B2 are displayed is 2τ, the period during which the bit pictures R4, G4 and B4 are displayed is 4τ and the period during which the bit pictures R8, G8 and B8 are displayed is 8τ, where τ is the period during which each of the bit pictures R1, G1 and B1 is displayed.

Referring to FIGS. 26A to 26C, the controller 35 controls the light-emitting diode driving circuits 34R, 34G and 34B, in timed relation to the timing of display of the red, green and blue bit pictures on the picture display light valve 65, so that the light-emitting diodes 12R, 12G and 12B will be turned on sequentially. The controller 35 controls the light-emitting diode driving circuits 34R, 34G and 34B so that the light volume from the light-emitting diodes 12R, 12G and 12B will be the light volume perceived as being agreeable to the human eye.

By the above operations, the light beams of the plural bit pictures, weighted from color to color in each frame, are sequentially projected on the screen 17. The bit pictures are perceived as being a color picture by the viewer because of the after-image effect proper to the human visual system. When time-divisionally displaying plural monochromatic pictures, bit pictures with different display colors are sequentially displayed in such a manner as to evade continuous display of the bit colors of the same colors for shortening the time during which the monochromatic pictures are displayed continuously. This eliminates the occurrence of the color splitting or the edge chromatic phenomenon.

Next, an example shown in FIG. 27 is explained. In the example of FIG. 27, digital gradation representation is done by the pulse width modulation gradation representation. Thus, a bit plane BP1 with the weighting equal to 1, a bit plane BP3 with the weighting equal to 4, a bit plane BP2 with the weighting equal to 2, a bit plane BP4 with the weighting equal to 8 are displayed in this order.

That is, in the example of FIG. 27, pictures R1, G1 and B1, each having a pulse width equal to τ, are displayed in this order as the bit plane BP1 having the weighting equal to 1. Then, pictures R4, G4 and B4, each having a pulse width equal to τ, are displayed in this order as the bit plane BP3 having the weighting equal to 4. Next, pictures R2, G2 and B2, each having a pulse width equal to 2τ, are displayed in this order as the bit plane BP2 having the weighting equal to 2. Then, pictures R8, G8 and B8, each having a pulse width equal to 8τ, are displayed in this order as the bit plane BP4 having the weighting equal to 8.

When doing this display by the picture display device shown in FIG. 16, the controller 35 generates a pre-set timing signal in a timed relation to the input picture signal VS and sends the timing signal to the picture signal processing circuit 66 and to the light valve driving circuit 68. The picture signal processing circuit 66 is responsive to the timing signals to generate bit pictures R1, G1, B1, R4, G4, B4, R2, G2, B2, R8, G8 and B8 from frame to frame and sequentially switches and outputs the picture signals. The picture signals are transiently stored in the picture memory 67. The light valve driving circuit 68 is responsive to the timing signals from the controller 35 to read out sequentially the picture signals of the bit pictures from the picture memory 67 to drive the picture signal processing circuit 66 based on these picture signals.

In the present example, the bit pictures R1, G1, B1, R4, G4, B4, R2, G2, B2, R8, G8 and B8 are sequentially displayed beginning from the leading end of each frame, as shown in FIG. 27D. Since the pulse width modulation gradation representation is used in the present example, the period during which the bit pictures R2, G2 and B2 are displayed is 2τ, the period during which the bit pictures R4, G4 and B4 are displayed is 4τ and the period during which the bit pictures R8, G8 and B8 are displayed is 8τ, where τ is the period during which each of the bit pictures R1, G1 and B1 is displayed.

Referring to FIGS. 27A to 27C, the controller 35 controls the light-emitting diode driving circuits 34R, 34G and 34B, in timed relation to the timing of display of the red, green and blue bit pictures on the picture display light valve 65, so that the light-emitting diodes 12R, 12G and 12B will be turned on sequentially. The controller 35 controls the light-emitting diode driving circuits 34R, 34G and 34B so that the light volume from the light-emitting diodes 12R, 12G and 12B will be the light volume perceived as being agreeable to the human eye.

By the above operations, the light beams of the plural bit pictures, weighted from color to color in each frame, are sequentially projected on the screen 17. The bit pictures are perceived as being a color picture by the viewer because of the after-image effect proper to the human visual system. When time-divisionally displaying plural monochromatic pictures, bit pictures with different display colors are sequentially displayed in such a manner as to evade contiguous display of the bit colors of the same colors, thus shortening the time during which the monochromatic pictures are displayed continuously. This eliminates the occurrence of the color splitting or the edge chromatic phenomenon.

Next, an example shown in FIG. 28 is explained. In the example of FIG. 28, digital gradation representation is by the pulse width modulation gradation representation. Thus, the R1, G1, B1, R2, G2, B2, R4, G4, B4, R8, G8 and B8 making up the bit planes BP1, BP2, BP4, BP8 are interchanged in sequence for display.

That is, in the example of FIG. 28, for displaying a frame, a red bit picture R1 having a pulse width τ, a green bit picture G2 having a pulse width 2τ, a blue bit picture B8 having a pulse width 8τ, a red bit picture R4 having a pulse width 4τ, a green bit picture G8 having a pulse width 8τ, a blue bit picture B4 having a pulse width 4τ, a red bit picture R2 having a pulse width 2τ, a blue bit picture B1 having a pulse width τ, a green bit picture G4 having a pulse width 4τ, a red bit picture R8 having a pulse width 8τ, a blue bit picture B2 having a pulse width 2τ, and a green bit picture G1 having a pulse width τ are displayed in this order.

When doing this display by the picture display device shown in FIG. 16, the controller 35 generates a pre-set timing signal in a timed relation to the input picture signal VS and sends the timing signal to the picture signal processing circuit 66 and to the light valve driving circuit 68. The picture signal processing circuit 66 is responsive to the timing signals to generate bit pictures R1, G2, BS, R4, G8, B4, R2, B1, G4, R8, B2 and G1 from frame to frame and sequentially switches and outputs the picture signals. The picture signals are transiently stored in the picture memory 67. The light valve driving circuit 68 is responsive to the timing signals from the controller 35 to read out sequentially the picture signals of the bit pictures from the picture memory 67 to drive the picture display light valve 65 based on these picture signals.

At this time, the bit pictures R1, G2, B8, R4, G8, B4, R2, B1, G4, R8, B2 and G1 are sequentially displayed beginning from the leading end of each frame, as shown in FIG. 28D. Since the pulse width modulation gradation representation is used in the present example, the period during which the bit pictures R2, G2 and B2 are displayed is 2τ, the period during which the bit pictures R4, G4 and B4 are displayed is 4τ and the period during which the bit pictures R8, G8 and B8 are displayed is 8τ, where r is the period during which each of the bit pictures R1, G1 and B1 is displayed.

Referring to FIGS. 28A to 28C, the controller 35 controls the light-emitting diode driving circuits 34R, 34G and 34B, in timed relation to the timing of display of the red, green and blue bit pictures on the picture display light valve 65, so that the light-emitting diodes 12R, 12G and 12B will be turned on sequentially.

The controller 35 controls the light-emitting diode driving circuits 34R, 34G and 34B so that the light volume from the light-emitting diodes 12R, 12G and 12B will be the light volume perceived as being agreeable to the human eye.

By the above operations, the light beams of the plural bit pictures, weighted from color to color in each frame, are sequentially projected on the screen 17. The bit pictures are perceived as being a color picture by the viewer because of the after-image effect proper to the human visual system. When time-divisionally displaying plural monochromatic pictures, bit pictures with different display colors are sequentially displayed in such a manner as to evade contiguous display of the bit colors of the same colors, thereby shortening the time during which the monochromatic pictures are displayed continuously. This eliminates the occurrence of the color splitting or the edge chromatic phenomenon.

Next, an example shown in FIG. 29 is explained. In the example of FIG. 29, digital gradation representation is by the pulse width modulation gradation representation. Thus, the bit pictures R4, G4 and B4 are displayed in two installments, while the bit pictures R8, G8 and B8 are displayed in four installments.

That is, in the example of FIG. 29, a red bit picture R8 with a pulse width 2τ, a green bit picture G8 with a pulse width 2τ and a blue bit picture B8 with a pulse width 2τ are displayed in this order. Then, a red bit picture R4 with a pulse width 2τ, a green bit picture G4 with a pulse width 2τ and a blue bit picture B4 with a pulse width 2τ are displayed in this order. Next, a red bit picture R8 with a pulse width 2τ, a green bit picture G8 with a pulse width 2τ and a blue bit picture B8 with a pulse width 2τ are displayed in this order. Then, a red bit picture R2 with a pulse width 2τ, a green bit picture G2 with a pulse width 2τ and a blue bit picture B2 with a pulse width 2τ are displayed in this order.

Then, a red bit picture R1 with a pulse width τ, a green bit picture G1 with a pulse width τ and a blue bit picture B1 with a pulse width τ are displayed in this order. Then, a red bit picture R8 with a pulse width 2τ, a green bit picture G8 with a pulse width 2τ and a blue bit picture B8 with a pulse width 2τ are displayed in this order. Next, a red bit picture R4 with a pulse width 2τ, a green bit picture G4 with a pulse width 2τ and a blue bit picture B4 with a pulse width 2τ, are displayed in this order. Then, a red bit picture R8 with a pulse width 2τ, a green bit picture G8 with a pulse width 2τ and a blue bit picture B8 with a pulse width 2τ, are displayed in this order.

If this display is done by the picture display device shown in FIG. 16, the controller 35 generates pre-set timing signals synchronized with the input picture signals VS, and sends the timing signals to the picture signal processing circuit 66 and to the light valve driving circuit 68. The picture signal processing circuit 66 is responsive to these timing signals to generate picture signals of bit pictures R8, G8, B8, R4, G4, B4, R8, G8, B8, R2, G2, B2, R1, G1, B1, R8, G8, B8, R4, G4, B4, R8, G8, B8 each frame and sequentially switches and outputs the picture signals. These picture signals are transiently stored on the picture memory 67. The light valve driving circuit 68 is responsive to the timing signals from the controller 35 to read out sequentially the picture signals of the bit pictures from the picture memory 67 to drive the picture display light valve 65 based on these picture signals.

At this time, the bit pictures R8, G8, 18, R4, G4, B4, R8, G8, B8, R2, G2, B2, R1, G1, B1, R8, G8, B8, R4, G4, B4, R8, G8, B8 are sequentially displayed beginning from the leading end of each frame, as shown in FIG. 29D. Since the pulse width modulation gradation representation is used in the present example, and the bit pictures R4, G4 and B4 are displayed in two installments, while the bit pictures R8, G8 and B8 are displayed in four installments, the period during which the bit pictures R2, G2 and B2 are displayed is $2\tau$, the period during which the bit pictures R2, G2, B2, R4, G4, B4, R8, G8, B8 are displayed is $4\tau$ where $\tau$ is the period during which each of the bit pictures R1, G1 and B1 is displayed.

Referring to FIGS. 29A to 29C, the controller 35 controls the light-emitting diode driving circuits 34R, 34G and 34B, in timed relation to the timing of display of the red, green and blue bit pictures on the picture display light valve 65, so that the light-emitting diodes 12R, 12G and 12B will be turned on sequentially. The controller 35 controls the light-emitting diode driving circuits 34R, 34G and 34B so that the light volume from the light-emitting diodes 12R, 12G and 12B will be the light volume perceived as being agreeable to the human eye.

By the above operations, the light beams of the plural bit pictures, weighted from color to color in each frame, are sequentially projected on the screen 17. The bit pictures are perceived as being a color picture by the viewer because of the after-image effect proper to the human visual system. When time-divisionally displaying plural monochromatic pictures, bit pictures with different display colors are sequentially displayed in such a manner as to evade contiguous display of the bit colors of the same colors, thereby shortening the time during which the monochromatic pictures are displayed continuously. This eliminates the occurrence of the color splitting or the edge chromatic phenomenon. Moreover, since the variations in the display periods of the bit pictures in the present embodiment may be reduced, the picture displayed is of a higher picture quality.

Next, an example shown in FIG. 30 is explained. In the example of FIG. 30, digital gradation representation is by the pulse width modulation gradation representation. Thus, the bit pictures R4, G4 and B4 are displayed in two installments, while the bit pictures R8, G8 and B8 are displayed in four installments, as in the example of FIG. 29. In addition, in the present example, the bit pictures R1, G1, B1, R2, G2, B2, R4, G4, B4, R8, G8, B8 are displayed in an interchanged sequence.

That is, in the example of FIG. 30, a red bit picture R8 with a pulse width $2\tau$, a green bit picture G4 with a pulse width $2\tau$ and a blue bit picture B2 with a pulse width $2\tau$ are displayed in this order. Then, a red bit picture R4 with a pulse width $2\tau$, a green bit picture G8 with a pulse width $2\tau$ and a blue bit picture B4 with a pulse width $2\tau$ are displayed in this order. Next, a red bit picture R8 with a pulse width $2\tau$, a green bit picture G2 with a pulse width $2\tau$ and a blue bit picture B8 with a pulse width $2\tau$ are displayed in this order. Then, a red bit picture R2 with a pulse width $2\tau$, a green bit picture G8 with a pulse width $2\tau$ and a blue bit picture B8 with a pulse width $2\tau$ are displayed in this order. Then, a red bit picture R1 with a pulse width $\tau$, a green bit picture G1 with a pulse width $\tau$ and a blue bit picture B1 with a pulse width $\tau$ are displayed in this order. Then, a red bit picture R8 with a pulse width $2\tau$, a green bit picture G8 with a pulse width $2\tau$, and a blue bit picture B4 with a pulse width $2\tau$ are displayed in this order. Next, a red bit picture R4 with a pulse width $2\tau$, a green bit picture G4 with a pulse width $2\tau$, and a blue bit picture B8 with a pulse width $2\tau$ are displayed in this order. Then, a red bit picture R8 with a pulse width $2\tau$, a green bit picture G8 with a pulse width $2\tau$ and a blue bit picture B8 with a pulse width $2\tau$ are displayed in this order.

If this display is done by the picture display device shown in FIG. 16, the controller 35 generates pre-set timing signals synchronized with the input picture signals VS, and sends the timing signals to the picture signal processing circuit 66 and to the light valve driving circuit 68. The picture signal processing circuit 66 is responsive to these timing signals to generate picture signals of bit pictures R8, G4, B2, R4, G8, B4, R8, G2, B8, R2, G8, B8, R1, G1, B1, R8, G8, B8, R4, G4, B4, R8, G8, B8 each frame and sequentially switches and outputs the picture signals. These picture signals are transiently stored on the picture memory 67. The light valve driving circuit 68 is responsive to the timing signals from the controller 35 to read out sequentially the picture signals of the bit pictures from the picture memory 67 to drive the picture display light valve 65 based on these picture signals.

At this time, the bit pictures R8, G4, B2, R4, G8, B4, R8, G2, B8, R2, G8, B8, R1, G1, B1, R8, G8, B4, R4, G4, B8, R8, G8, B8 are sequentially displayed beginning from the leading end of each frame, as shown in FIG. 30D. Since the pulse width modulation gradation representation is used in the present example, and the bit pictures R4, G4 and B4 are displayed in two installments, while the bit pictures R8, G8 and B8 are displayed in four installments, the period during which the bit pictures R2, G2, B2, R4, G4, B4, R8, G8, B8 are displayed is $2\tau$ where $\tau$ is the period during which each of the bit pictures R1, G1 and B1 is displayed.

Referring to FIGS. 30A to 30C, the controller 35 controls the light-emitting diode driving circuits 34R, 34G and 34B, in timed relation to the timing of display of the red, green and blue bit pictures on the picture display light valve 65, so that the light-emitting diodes 12R, 12G and 12B will be turned on sequentially. The controller 35 controls the light-emitting diode driving circuits 34R, 34G and 34B so that the light volume from the light-emitting diodes 12R, 12G and 12B will be the light volume perceived as being agreeable to the human eye.

By the above operations, the light beams of the plural bit pictures, weighted from color to color in each frame, are sequentially projected on the screen 17. The bit pictures are perceived as being a color picture by the viewer because of the after-image effect proper to the human visual system. When time-divisionally displaying plural monochromatic pictures, bit pictures with different display colors are sequentially displayed in such a manner as to evade contiguous display of the bit colors of the same colors, thereby reducing the time during which the monochromatic pictures are displayed continuously. This eliminates the occurrence of the color splitting or the edge chromatic phenomenon. Moreover, since the variations in the display periods of the bit pictures in the present embodiment may be reduced, the picture displayed is of a higher picture quality.

Next, an example shown in FIG. 31 is explained. In the example of FIG. 31, digital gradation representation is by the pulse width modulation gradation representation. Thus, a bit plane BP1 with the weighting equal to 1, a bit plane BP2 with the weighting equal to 2, a bit plane BP3 with the weighting equal to 4 and a bit plane BP4 with the weighting equal to 8 are displayed in this order.

That is, for displaying a frame in the example of FIG. 31, pictures R1, G1 and B1, each having a light emission volume set to I, are displayed in this order as a bit plane BP1 having a weighting equal to 1. Then, pictures R2, G2 and B2, each having a light emission volume set to 2I, are displayed in this order as a bit plane BP2 having a weighting equal to 2, and pictures R4, G4 and B4, each having a light emission volume set to 4I, are displayed in this order as a bit plane BP3 having a weighting equal to 4. Finally, pictures R8, G8 and B8, each having a light emission volume set to 8I, are displayed in this order as a bit plane BP4 having a weighting equal to 8.

If this display is done by the picture display device shown in FIG. 16, the controller 35 generates pre-set timing signals synchronized with the input picture signals VS, and sends the timing signals to the picture signal processing circuit 66 and to the light valve driving circuit 68. The picture signal processing circuit 66 is responsive to these timing signals to generate picture signals of bit pictures R1, G1, B1, R2, G2, B2, R4, G4, B4, R8, G8, B8 each frame and sequentially switches and outputs the picture signals. These picture signals are transiently stored on the picture memory 67. The light valve driving circuit 68 is responsive to the timing signals from the controller 35 to read out sequentially the picture signals of the bit pictures from the picture memory 67 to drive the picture display light valve 65 based on these picture signals.

In the present example, the bit pictures R1, G1, B1, R2, G2, B2, R4, G4, B4, R8, G8, B8 are sequentially displayed beginning from the leading end of each frame, as shown in FIG. 3 ID. The display periods for the bit pictures R1, G1, B1, R2, G2, B2, R4, G4, B4, R8, G8, B8 are all of the same period τ.

Referring to FIGS. 31A to 31C, the controller 35 controls the light-emitting diode driving circuits 34R, 34G and 34B, in timed relation to the timing of display of the red, green and blue bit pictures on the picture display light valve 65, so that the light-emitting diodes 12R, 12G and 12B will be turned on sequentially.

Since the present embodiment is of the light intensity modulation gradation representation system, the controller 35 controls the light-emitting diode driving circuits 34R, 34G and 34B so that the light emission volume of the light-emitting diodes 12R, 12G and 12B for displaying the bit pictures R2, G2 and B2 will be 2I, the light emission volume of the light-emitting diodes 12R, 12G and 12B for displaying the bit pictures R4, G4 and B4 will be 4I and the light emission volume of the light-emitting diodes 12R, 12G and 12B for displaying the bit pictures R8, G8 and B8 will be 8I, where I is the light emission volume for displaying the bit pictures R1, G1 and B1. The light emission volume ratio of the light-emitting diodes 12R, 12G and 12B can be made variable depending on the human luminosity and liking of the user.

By the above operations, the light beams of the plural bit pictures, weighted from color to color in each frame, are sequentially projected on the screen 17. The bit pictures are perceived as being a color picture by the viewer because of the after-image effect proper to the human visual system. When time-divisionally displaying plural monochromatic pictures, bit pictures with different display colors are sequentially displayed in such a manner as to evade continuous display of the bit colors of the same colors for shortening the time during which the monochromatic pictures are displayed contiguously. This reduces the occurrence of the color splitting or the edge chromatic phenomenon.

Then, an example shown in FIG. 32 is explained. In the example of FIG. 32, digital gradation representation is by the pulse width modulation gradation representation. Thus, a bit plane BP1 with the weighting equal to 1, a bit plane BP3 with the weighting equal to 4, a bit plane BP2 with the weighting equal to 2, and a bit plane BP4 with the weighting equal to 8 are displayed in this order.

That is, for displaying a frame in the example of FIG. 32, pictures R1, G1 and B1, each having a light emission volume set to 1, are displayed in this order as a bit plane BP1 having a weighting equal to 1. Then, pictures R4, G4 and B4, each having a light emission volume set to 4I, are displayed in this order as a bit plane BP3 having a weighting equal to 4, and pictures R2, G2 and B2, each having a light emission volume set to 2I, are displayed in this order as a bit plane BP2 having a weighting equal to 2. Finally, pictures R8, G8 and B8, each having a light emission volume set to 8I, are displayed in this order as a bit plane BP4 having a weighting equal to 8.

If this display is done by the picture display device shown in FIG. 16, the controller 3 5 generates pre-set timing signals synchronized with the input picture signals VS, and sends the timing signals to the picture signal processing circuit 66 and to the light valve driving circuit 68. The picture signal processing circuit 66 is responsive to these timing signals to generate picture signals of bit pictures R1, G1, B1, R4, G4, B4, R2, G2, B2, R8, G8, B8 each frame and sequentially switches and outputs the picture signals. These picture signals are transiently stored on the picture memory 67. The light valve driving circuit 68 is responsive to the timing signals from the controller 35 to read out sequentially the picture signals of the bit pictures from the picture memory 67 to drive the picture display light valve 65 based on these picture signals.

In the present example, the bit pictures R1, G1, B1, R4, G4, B4, R2, G2, B2, R8, G8, B8 are sequentially displayed beginning from the leading end of each frame, as shown in FIG. 32D. The display periods for the bit pictures R1, G1, B1, R4, G4, B4, R2, G2, B2, R8, G8, B8 are all of the same period τ.

Referring to FIGS. 32A to 32C, the controller 35 controls the light-emitting diode driving circuits 34R, 34G and 34B, in timed relation to the timing of display of the red, green and blue bit pictures on the picture display light valve 65, so that the light-emitting diodes 12R, 12G and 12B will be turned on sequentially. Since the present embodiment is of the light intensity modulation gradation representation system, the controller 35 controls the light-emitting diode driving circuits 34R, 34G and 34B so that the light emission volume of the light-emitting diodes 12R, 12G and 12B for displaying the bit pictures R2, G2 and B2 will be 2I, the light emission volume of the light-emitting diodes 12R, 12G and 12B for displaying the bit pictures R4, G4 and B4 will be 4I and the light emission volume of the light-emitting diodes 12R, 12G and 12B for displaying the bit pictures R8, G8 and B8 will be 8I, where I is the light emission volume for displaying the bit pictures R1, G1 and B1. The light emission volume ratio of the light-emitting diodes 12R, 12G and 12B can also be varied depending on the human luminosity and liking of the user.

By the above operations, the light beams of the plural bit pictures, weighted from color to color in each frame, are sequentially projected on the screen 17. The bit pictures are perceived as being a color picture by the viewer because of the after-image effect proper to the human visual system. When time-divisionally displaying plural monochromatic pictures, bit pictures with different display colors are sequentially displayed in such a manner as to evade contiguous display of the bit colors of the same colors. This shortens the time during which the monochromatic pictures are displayed continuously and hence reduces the occurrence of the color splitting or the edge chromatic phenomenon.

Then, an example shown in FIG. 33 is explained. In the example of FIG. 33, digital gradation representation is by the pulse width modulation gradation representation. Thus, bit pictures R1, G1, B1, R2, G2, B2, R4, G4, B4, R8, G8, B8, making up the bit planes B1 to B4, are displayed in interchanged sequence.

That is, for displaying a frame in the example of FIG. 33, a red picture R1 with a light emission volume of I, a green picture G4 with an light emission volume of 4I, a blue picture B2 with a light emission volume of 2I, a red picture R2 with an light emission volume of 2I, a green picture G2 with an light emission volume of 2I, a blue picture B1 with an light emission volume of I, a red picture R4 with an light emission volume of 4I, a green picture G1 with an light emission volume of I, a blue picture B8 with an light emission volume of 8I, a red picture R8 with an light emission volume of 8I, a green picture G8 with an light emission volume of 8I, and a blue picture B4 with a light emission volume of 4I,are displayed in this order.

If this display is done by the picture display device shown in FIG. 16, the controller 35 generates pre-set timing signals synchronized with the input picture signals VS, and sends the timing signals to the picture signal processing circuit 66 and to the light valve driving circuit 68. The picture signal processing circuit 66 is responsive to these timing signals to generate picture signals of bit pictures R1, G4, B2, R2, G2, B1, R4, G1, B8, R8, G8, B4 each frame and sequentially switches and outputs the picture signals. These picture signals are transiently stored on the picture memory 67. The light valve driving circuit 68 is responsive to the timing signals from the controller 35 to read out sequentially the picture signals of the bit pictures from the picture memory 67 to drive the picture display light valve 65 based on these picture signals.

In the present example, the bit pictures R1, G4, B2, R2, G2, B1, R4, G1, B8, R8, G8, B4 are sequentially displayed beginning from the leading end of each frame, as shown in FIG. 33D. The display periods for the bit pictures R1, G4, B2, R2, G2, B1, R4, G1, B8, R8, G8, B4 are all of the same period τ.

Referring to FIGS. 33A to 33C, the controller 35 controls the light-emitting diode driving circuits 34R, 34G and 34B, in timed relation to the timing of display of the red, green and blue bit pictures on the picture display light valve 65, so that the light-emitting diodes 12R, 12G and 12B will be turned on sequentially. Since the present embodiment is of the light intensity modulation gradation representation system, the controller 35 controls the light-emitting diode driving circuits 34R, 34G and 34B so that the light emission volume of the light-emitting diodes 12R, 12G and 12B for displaying the bit pictures R2, G2 and B2 will be 2I, the light emission volume of the light-emitting diodes 12R, 12G and 12B for displaying the bit pictures R4, G4 and B4 will be 4I and the light emission volume of the light-emitting diodes 12R, 12G and 12B for displaying the bit pictures R8, G8 and B8 will be 8I, where I is the light emission volume for displaying the bit pictures R1, G1 and B1. The light emission volume ratio of the light-emitting diodes 12R, 12G and 12B can also be varied depending on the human luminosity and liking of the user.

By the above operations, the light beams of the plural bit pictures, weighted from color to color in each frame, are sequentially projected on the screen 17. The bit pictures are perceived as being a color picture by the viewer because of the after-image effect proper to the human visual system. When time-divisionally displaying plural monochromatic pictures, bit pictures with different display colors are sequentially displayed in such a manner as to evade contiguous display of the bit colors of the same colors. This shortens the time during which the monochromatic pictures are displayed contiguously and hence reduces the occurrence of the color splitting or the edge chromatic phenomenon.

By driving the picture display device as shown in FIGS. 26 to 33, color splitting or the edge chromatic phenomenon is hardly produced to enable display of a satisfactory picture.

Although 16 gradations are displayed in the above description, the number of gradations may be larger or smaller than 16 in applying the present invention. That is, 8 gradations may be displayed with the gradation data per pixel being 3 bits. Similarly, 256 gradations may be displayed with the gradation data per pixel being 8 bits, or 1024 gradations may be displayed with the gradation data per pixel being 16 bits.

What is claimed is:

1. A picture display apparatus for displaying a colored picture having gradation in brightness by time-divisional display of a plurality of monochromatic pictures, wherein said monochromatic pictures have colors different from each other, and each said monochromatic picture has a weighted plurality of pictures in each frame, and said weighted plurality of pictures comprising at least four pictures, and said weighted pictures are sequentially displayed so that the different color pictures are displayed consecutively.

2. The picture display apparatus as claimed in claim 1 wherein each monochromatic picture color is made up of three prime colors of light.

3. A picture display apparatus for displaying a colored picture having gradation in brightness by time-divisional display of a plurality of monochromatic pictures, wherein,
said monochromatic pictures have colors different from each other, and each said monochromatic picture has a weighted plurality of pictures in each frame, and said weighted plurality of pictures comprising at least four different weighted pictures, and said weighted pictures are sequentially displayed so that the different color pictures are displayed consecutively.

4. The picture display apparatus as claimed in claim 3 wherein each monochromatic picture color is made up of three prime colors of light.

* * * * *